US009090320B2

(12) United States Patent
Rufo et al.

(10) Patent No.: US 9,090,320 B2
(45) Date of Patent: Jul. 28, 2015

(54) AQUATIC VEHICLE

(71) Applicant: Boston Engineering Corporation, Waltham, MA (US)

(72) Inventors: Michael Rufo, Abington, MA (US); David Shane, Waltham, MA (US); Michael Conry, Medford, MA (US); Will Ober, Waltham, MA (US)

(73) Assignee: Boston Engineering Corporation, Waltham, MA (US)

( * ) Notice: Subject to any disclaimer, the term of this patent is extended or adjusted under 35 U.S.C. 154(b) by 46 days.

(21) Appl. No.: 13/792,689

(22) Filed: Mar. 11, 2013

(65) Prior Publication Data

US 2014/0109821 A1 Apr. 24, 2014

Related U.S. Application Data

(60) Provisional application No. 61/716,236, filed on Oct. 19, 2012.

(51) Int. Cl.

| B63G 8/08 | (2006.01) |
|---|---|
| B63H 11/00 | (2006.01) |
| F16F 3/00 | (2006.01) |
| B63B 7/08 | (2006.01) |
| B63H 1/36 | (2006.01) |
| F16F 1/02 | (2006.01) |

(52) U.S. Cl.
CPC . *B63G 8/08* (2013.01); *B63B 7/085* (2013.01); *B63H 1/36* (2013.01); *B63H 11/00* (2013.01); *F16F 1/025* (2013.01); *F16F 3/00* (2013.01); *Y02T 70/56* (2013.01)

(58) Field of Classification Search
CPC ........................................................ B63G 8/08

USPC ................................ 114/332; 440/14, 15, 13
See application file for complete search history.

(56) References Cited

U.S. PATENT DOCUMENTS

| 5,194,029 | A | * | 3/1993 | Kinoshita ..................... 446/35 |
|---|---|---|---|---|
| 5,401,196 | A | * | 3/1995 | Triantafyllou et al. ......... 440/13 |
| 5,740,750 | A | * | 4/1998 | Triantafyllou et al. ..... 114/67 R |
| 6,138,604 | A | * | 10/2000 | Anderson et al. ............. 114/332 |
| 6,814,634 | B2 | * | 11/2004 | Roberts ......................... 440/38 |
| 6,835,108 | B1 | * | 12/2004 | Gieseke ......................... 440/14 |
| 6,923,693 | B2 | * | 8/2005 | Borgen et al. .................. 440/15 |
| 7,727,169 | B1 | * | 6/2010 | Lewkowicz et al. .......... 600/593 |
| 7,865,268 | B2 | * | 1/2011 | Valdivia y Alvarado et al. ............................. 700/245 |
| 8,322,296 | B2 | * | 12/2012 | Tiraby et al. .................. 114/337 |
| 8,323,062 | B2 | * | 12/2012 | Bannasch et al. ............... 440/15 |
| 8,571,711 | B2 | * | 10/2013 | Jacobsen et al. .............. 700/247 |
| 8,641,464 | B2 | * | 2/2014 | Ortwig ............................ 441/64 |

(Continued)

OTHER PUBLICATIONS

Anderson et al. "The Vorticity Control Unmanned Undersea Vehicle (VCUUV): An Autonomous Robot Tuna." *The Boston Chapter of the IEEE's Robotics and Automation Society.* (1998).
Guo et al. "Tracking Control for a Biomimetic Autonomous Underwater Vehicle Using Pectoral and Caudal Fins." *Proc. 15th Int. Offshore Polar Engin. Conf.* (2005):536-543.

(Continued)

*Primary Examiner* — Lars A Olson
*Assistant Examiner* — Jovon Hayes
(74) *Attorney, Agent, or Firm* — Mintz Levin Cohn Ferris Glovsky and Popeo, P.C.

(57) ABSTRACT

An underwater vehicle includes a fore-body and a flexible aft. The flexible aft includes a flexible body. The flexible body includes a spring body including a spring element extending along a main axis, and a cavity. Related apparatus, systems, techniques, and articles are also described.

35 Claims, 23 Drawing Sheets

(56) References Cited

U.S. PATENT DOCUMENTS

2012/0312221 A1* 12/2012 Vosburgh .................. 114/331
2014/0109821 A1* 4/2014 Rufo et al. ................. 114/337

OTHER PUBLICATIONS

Traintafyllou et al. "An Efficient Swimming Machine." *Scientific American*. 272.3(1995):64-70.

\* cited by examiner

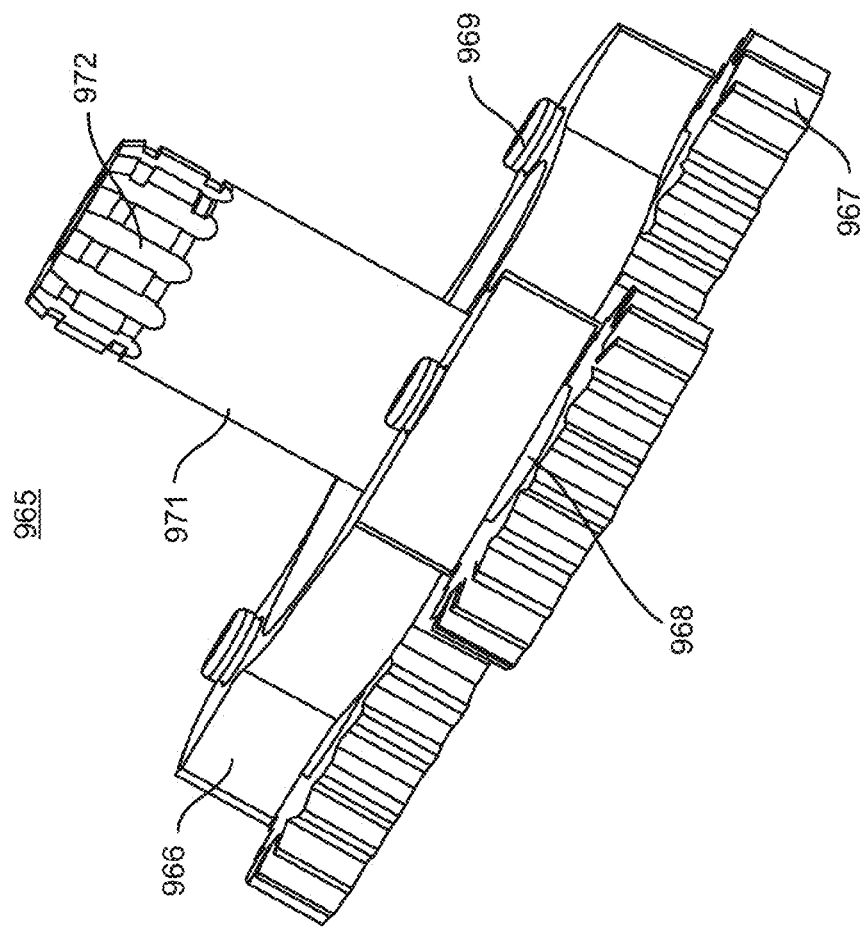
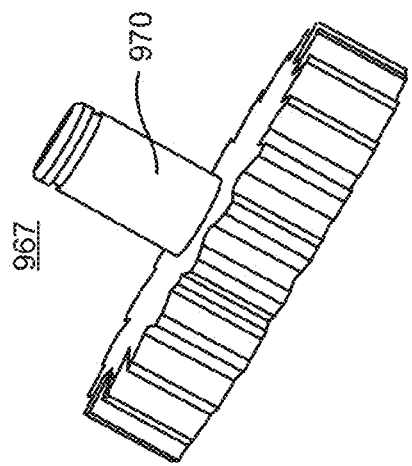
FIG. 13A
FIG. 13B

AQUATIC VEHICLE

RELATED APPLICATIONS

This application claims priority to U.S. Provisional Application No. 61/716,236, filed Oct. 19, 2012, the entire contents of which is hereby incorporated by reference.

STATEMENT REGARDING FEDERALLY SPONSORED RESEARCH AND DEVELOPMENT

At least a portion of the current subject matter was made with government support under contracts numbered N00014-09-C-0657, N00014-08-M-0294, and SBIR N08-T030 awarded by the Department of Defense. The government may have certain rights in the invention.

TECHNICAL FIELD

The subject matter described herein relates to highly maneuverable underwater vehicles with efficient propulsion.

BACKGROUND

An autonomous underwater vehicle (AUV) is a robot that can operate in underwater and unstructured environments without continuous human guidance. AUVs constitute part of a larger group of undersea systems known as unmanned underwater vehicles (UUVs) (alternatively referred to as unmanned undersea vehicles), a classification that includes non-autonomous remotely operated underwater vehicles (ROVs)—controlled and powered from the surface by an operator/pilot via an umbilical or using remote control.

AUVs can rely on a number of propulsion techniques, but propeller based thrusters or Kort nozzles are the most common by far. These thrusters are usually powered by electric motors and sometimes rely on a bore or lip seals in order to protect the motor internals from electric shorting and corrosion. An alternative to propeller-based propulsion includes underwater gliding. An underwater glider is a type of AUV that do not directly propel themselves. They use small changes in buoyancy in conjunction with wings to convert vertical motion to horizontal, and thereby propel themself forward with a sawtooth-like up-and-down profile through the water. Because of their low speed and low power electronics, the energy required to cycle trim states is far less than for regular AUVs. In this manner, gliders trade speed and responsiveness for endurance and gain a significant increase in range and duration of operation compared to vehicles propelled by electric motor-driven propellers. However, no current AUV is capable of all aspects; speed, maneuverability, and endurance.

Existing UUVs are commonly cylindrical and exhibit poor maneuverability, particularly in littoral and riverine areas. They often use rigid bodies combined with propellers and as a result can be limited in efficiency (of propulsion and maneuvering) by the practical propeller diameter, exhibit poor transiency response, and low propulsion efficiency over ranges of speeds and maneuvers. A lack of control authority caused by a single propeller based system with a rigid body can prevent the execution of missions in cluttered and complex environments.

SUMMARY

An underwater vehicle includes a fore-body and a flexible aft. The flexible aft includes a flexible body, a drive system, and an actuator system.

In one aspect, a flexible body includes a spring body including a spring element extending along a main axis and a cavity within the spring body.

In another aspect, an aquatic vehicle includes a fore-body, an aft section, and an actuator system at least partially within the aft section. The aft section is configured such that, when the aquatic vehicle is within liquid, at least a portion the aft section is flooded with liquid such that at least a portion of the actuator system is submerged. The actuator system is configured such that, when the actuator system is operated while at least a portion of the actuator system is submersed in liquid, the liquid serves to transfer thermal energy produced by the actuator system away from the actuator system.

In yet another aspect, an aquatic vehicle includes a fore-body, an actuation system connected to the fore-body, a drive system comprising a plurality of flexure points and actuated by the actuation system, and a flexible body attached to the fore-body and enclosing at least a portion of the drive system. The flexible body includes a spring body, which includes a spring element extending along a main axis, and a cavity within the spring body.

One or more of the following features can be included. For example, the flexible body can include features extending in a second axis perpendicular to the main axis and defining an outer shape. The cavity can be within one or more of the features. Each spring element can include two opposed semicircular portions formed in an S shape and the features extending in the second axis can include tabs. Each feature can be integral with a corresponding semicircular portion such that each spring element has at least two opposite facing features. The flexible body outer shape can be biomimetic, conic, or cylindrical. The features can taper along the main axis.

The spring body can include a plurality of spring elements. One or more attributes of the spring elements can vary among the spring elements. The attributes can include one or more of shape, amplitude, frequency, materials, and thickness. The attributes can vary such that when deflected, the flexible body moves in a biomimetic motion. The cavity can extend the entire length of the spring body. The cavity can extend through a partial length of the spring body. The cavity can include a plurality of discreet cavities. At least a portion of a drive system can reside within the cavity. The flexible body can form a frame structure for a drive system contained at least partially within the cavity. The flexible body can be attached to a fore-body. Each spring element or their combination can be biomimetic.

The aquatic vehicle actuator system can include a top housing, a bottom housing affixed to the top housing, a rotor assembly, a mechanical reduction assembly, and a bearing housing. The bottom housing can include a main body, a feedback sensor, a stator, and a thrust bushing. The rotor assembly can be disposed within the bottom housing and top housing and can include a rotor, a rotor hub, and a rotation element. The mechanical reduction assembly can be disposed within the bottom housing and top housing, and can be coupled to the rotor assembly rotation element. The mechanical reduction assembly can include a mechanical reduction, one or more rotation elements, and an output shaft. The bearing housing assembly can be affixed to one of the top housing and bottom housing and can provide for a rotation of the mechanical reduction. The bearing housing assembly can include a bearing, and a bearing housing.

An electrical current applied to the stator can cause the rotor assembly to rotate around the rotor hub, thereby causing the mechanical reduction output shaft to rotate. The rotor assembly rotational element can be coupled to the one or more mechanical reduction rotational elements such that a rotation of the rotor imparts a rotation to the mechanical reduction. The actuator system can include ports and features to enable seal testing.

When the aquatic vehicle is submerged in liquid, the aft can allow liquid to move between an interior and exterior of the aft, the exterior of the aft including an external environment. The aft can comprise a flexible body. An outer shape of the vehicle can be biomimetic, conical, or cylindrical. The vehicle can be configured for biomimetic propulsion.

The actuation system can include an actuator, one or more interface supports having features, electrical connections, a seal, and the actuator being secured to the features, and one or more connector blocks connected to the fore-body and the interface supports. The actuation system can disconnect from the fore-body. A second different actuation system can connect to the fore-body.

The drive system can include a body with one or more flexible points in the body, first connectors coupled to the actuation system at a first end, and second connectors coupled to a propulsive element at a second end. The aquatic vehicle can include a propulsive element located at a posterior end of the vehicle. The propulsive element can include one or more of: foil, biomimetic foil, thruster, and water jet.

The flexible body can define a volume, and when the aquatic vehicle is submerged in liquid, a portion of the volume can be flooded with the liquid such that, at least a portion of one or more of the actuation system and the drive system can be submerged.

The subject matter described herein provides many advantages. For example, the current subject matter provides improved maneuverability (e.g., small turning radius), higher maneuverability efficiency (e.g., maneuvers require less energy), higher propulsion efficiency (at both low and high speeds), and higher operating speeds (both straight line and during maneuver) when compared to prior UUVs. The greater energy efficiency enables longer operation times, unattended mission execution, increased operation range, improved payload capacity (as a percentage of total vehicle volume and/or weight).

Additionally, the current subject matter can operate in environments with confined spaces, exhibiting increased flow and unsteady water conditions, as well as environments that require frequent maneuvering (e.g., winding scenarios). Prior UUVs require considerable energy to make planar turns due to their large turning radius while the current subject matter achieves the same maneuver in a shorter time span and with minimal impact to normal operating energy usage.

An actuation system can provide operation in a submerged state. The actuation system removes the requirement for seals, sealing features, sealing housings, and other like items. This enables improved performance, improved reliability, and reduced cost. Performance is improved by the elimination of drag losses and adverse dynamic damping effects from seals, and provides infinite and omnidirectional heat sinking to the environment such that thermal power losses are reduced and the actuator can be driven at peak power levels (including, in some implementations, above power levels specified by manufacturers). Cost is reduced through minimizing part count, eliminating requirements for scheduled maintenance, and minimization of assembly steps in production. Reliability is increased through the removal of risk of overheating of electrical components, removal of potential failure points in the system, and removal of the requirement for regular maintenance.

Submersion of an actuator can apply to various technologies. For example, electromechanical actuators, Lorentz actuators, shape memory alloys, and artificial muscles.

The current subject matter can be applied in the oil and gas industry for exploration, mapping, and surveillance for natural energy sourcing and pipeline operations. Additionally, the current subject matter's high maneuverability and rapid response at relevant speeds enables the current subject matter to operate in complex environments with many obstacles and unsteady fluid flows that less maneuverable UUVs cannot access. For example, the current subject matter can operate to inspect large-vessel propellers, operate between pier pilings, perform rescue missions up river, and environmental sensing in littorals (including near-surf zones). Embodiments of the current subject matter can be implemented to be man-portable and deployable from small crafts such as rigid-hulled inflatable boats.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 13A is a schematic illustrating an implementation of a mechanical reduction assembly;

FIG. 13B is a schematic illustrating an implementation of planet gears;

Like reference symbols in the various drawings indicate like elements.

DETAILED DESCRIPTION

Figure 1:
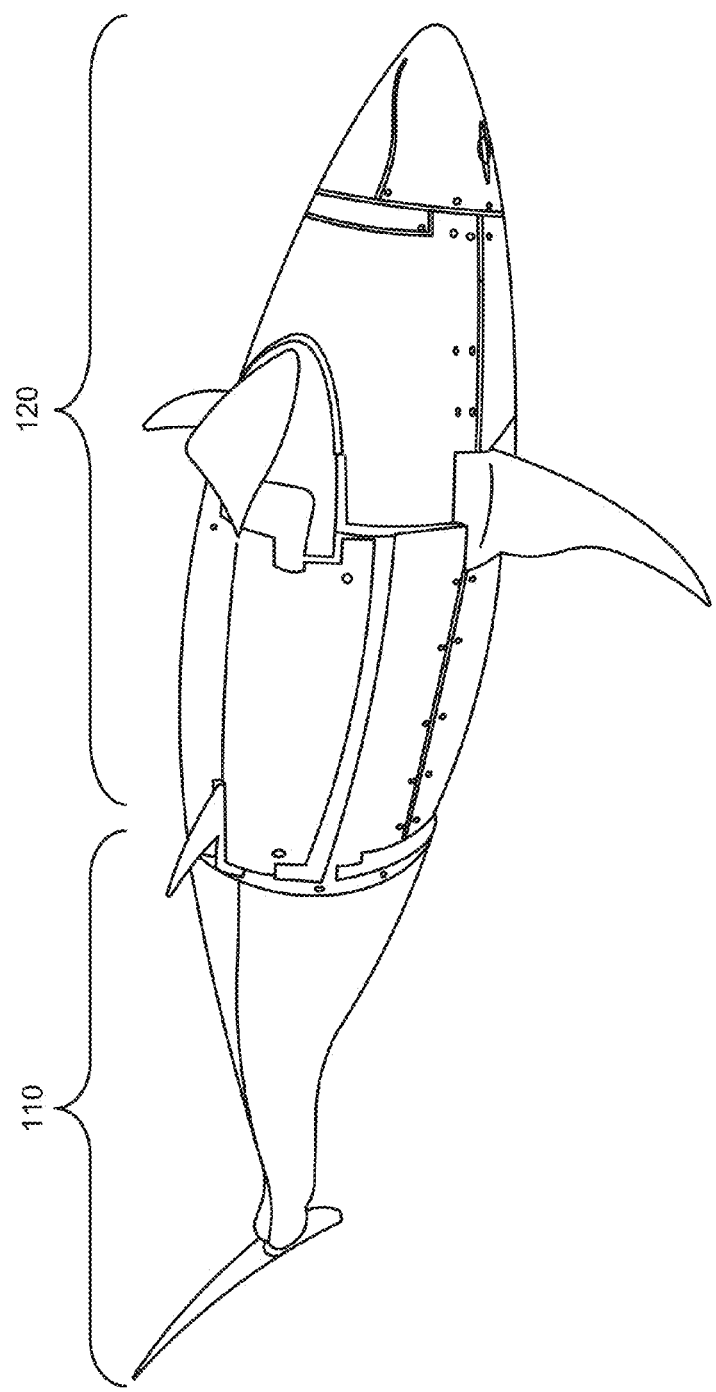
FIG. 1 is a photograph of an implementation of a UUV with a flexible aft and fore-body.

FIG. 1 is a photograph of a biomimetic UUV with a fore-body 120 and a flexible-aft 110 or tail. Although, in the embodiment shown, the UUV is fish-shaped, other shapes are anticipated. For example, the fore-body 120 and/or flexible-aft 110 can be a simple tube or cylindrical shape and are preferably hydrodynamic (i.e., streamlined). To achieve propulsion, the UUV moves a propulsive element (such as a foil) attached to the end of the flexible aft 110 in a side-to-side (while side-to-side is used herein it is not intended to be limiting, for example, motion can be up-and-down /back-and-forth, etc.) direction thereby "swimming" in a manner similar to a fish. Biomimetic refers to human-made processes, substances, devices, systems, and the like, that imitate nature.

Figure 2:
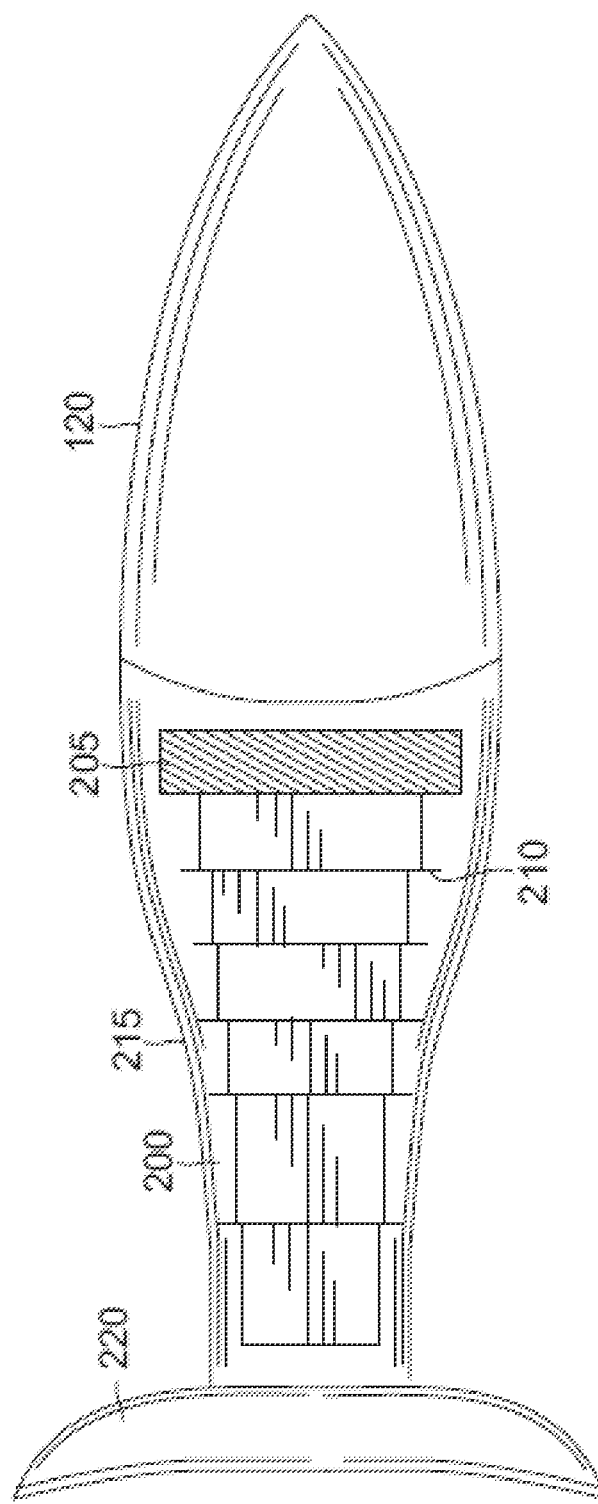
FIG. 2 is a drawing illustrating the components of an implementation of the flexible aft.

FIG. 2 is a drawing illustrating the components of the flexible aft 110. The flexible aft 110 includes a flexible body 200, an actuation system 205, a drive system 210, an outer skin 215, and a propulsive element 220.The flexible body 200 gives shape to the flexible aft 110, covers the drive system 210, and is flexible to allow for deflection by the drive system 210. Additionally, the flexible body 200 is elastic (i.e., has spring characteristics) that can be utilized advantageously to improve propulsion and maneuvering efficiency. The propulsive element 220 can include a foil, thrusters, water jets, other propulsive means, or combinations thereof.

Figure 3:
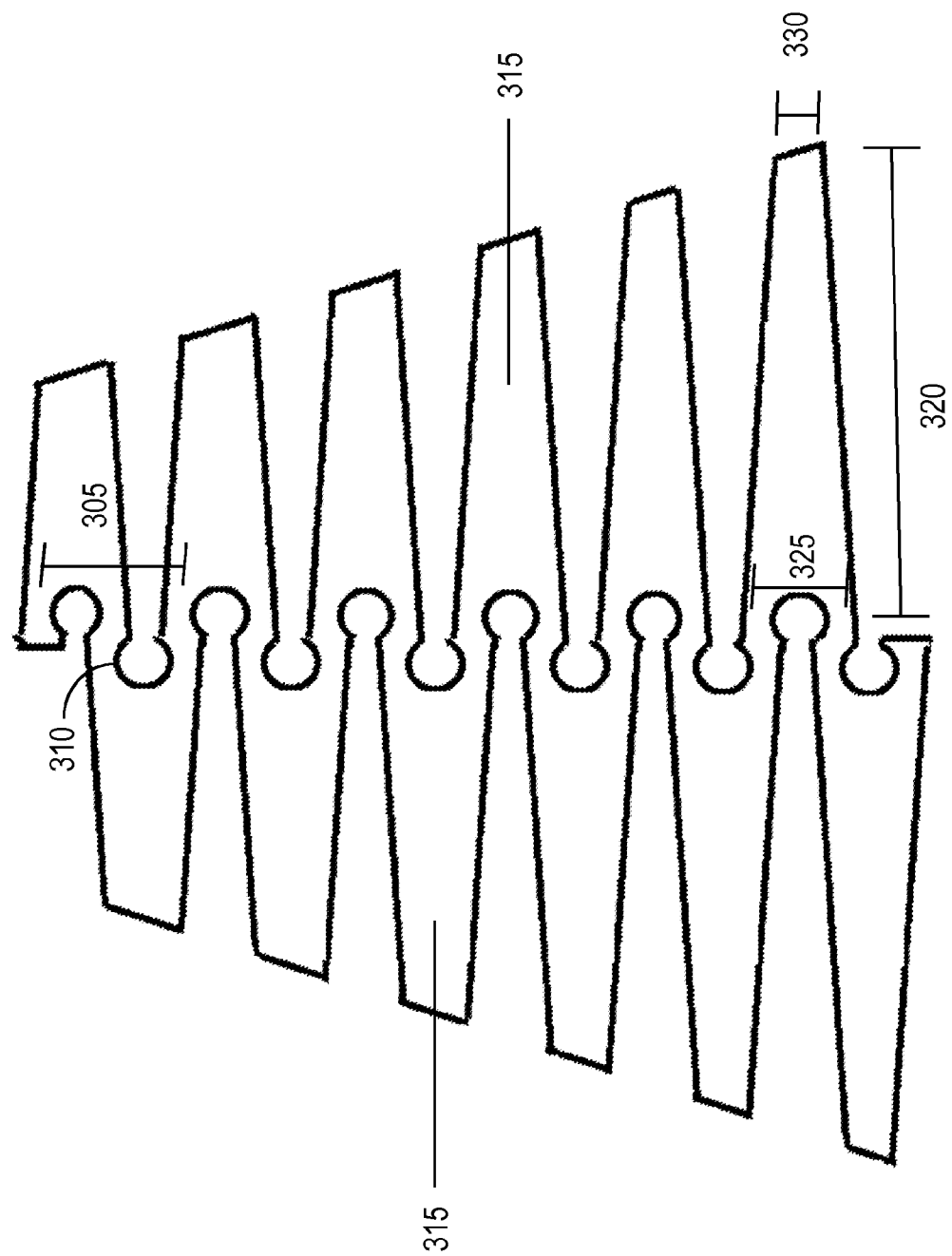
FIG. 3 is a drawing illustrating a cross section of an implementation of a flexible body.

FIG. 3 is a drawing illustrating a cross section of an implementation of a flexible body 200. The flexible body 200 is a spring body that includes one or more spring elements 305. In this implementation, the elements are S-shaped spring elements 305 and are formed end-to-end along a main axis. Each spring element 305 can include two opposed open elements 310 (e.g., semicircular or semi-annular elements). For each open element, a feature (e.g., a tab) 315 extends laterally from the main axis so that each spring element 305 includes two opposite facing features 315. The features 315 can have a feature length 320, a feature proximal width 325, and a feature distal width 330.

Figure 4:
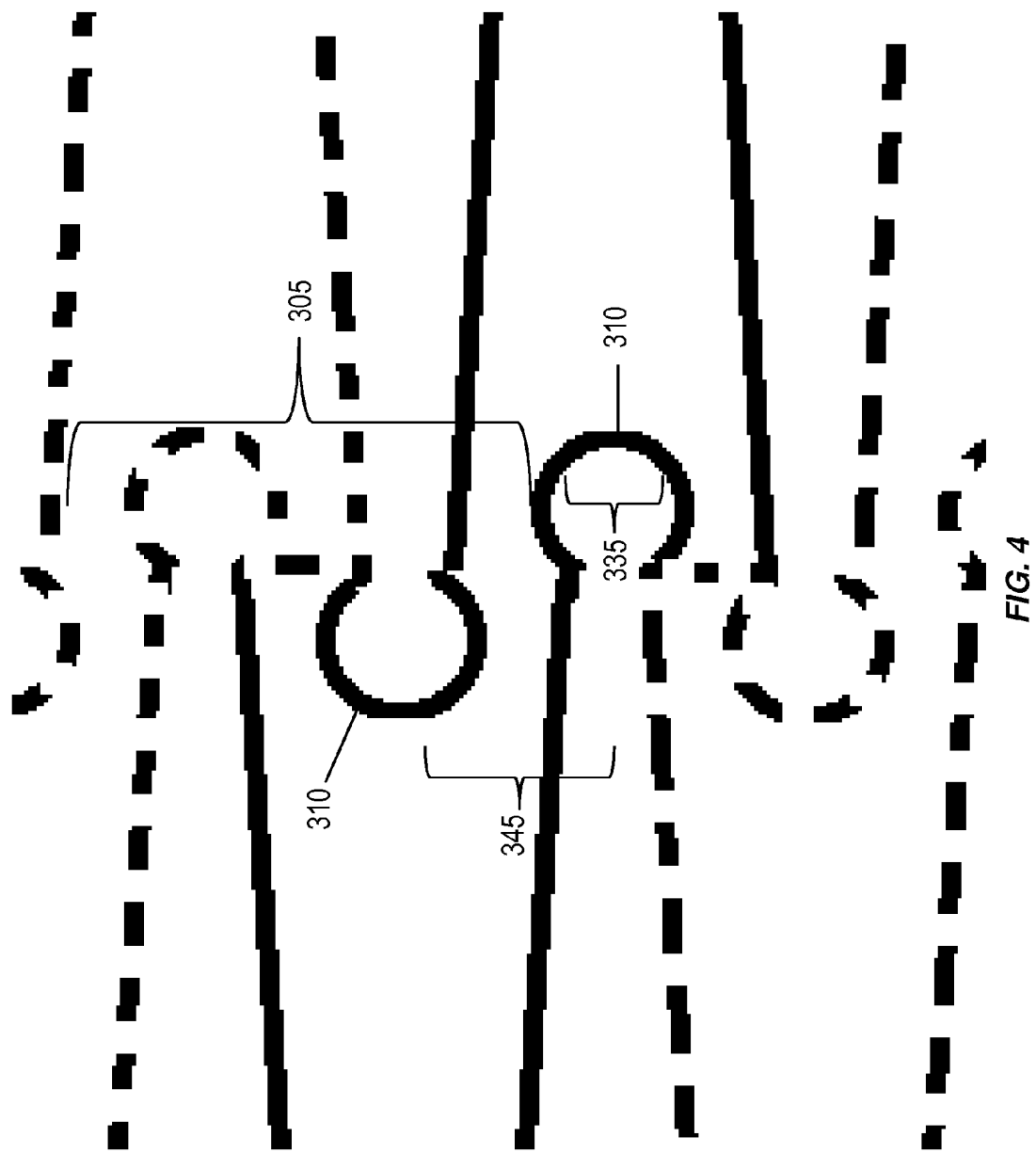
FIG. 4 is a drawing illustrating a close up view of a cross section of an implementation of a spring element.

FIG. 4 is a drawing illustrating a close up view of an implementation of a cross section of a spring element 305. Each open element 310 has a diameter 335. Each spring element 305 has an amplitude 340 that is the distance along an axis perpendicular to the main axis between the center of one open element 310 and the center of the other open element 310. Each spring element 305 has a frequency 345, which is the number of repetitions of spring elements over a unit distance (as measured along the main axis). The diameter 335 of each semicircular element 310 as well as the amplitude 340 and the frequency 345 of each spring element 310 can be varied to control characteristics of the flexible body 200 such as range of motion/deflection, spring constant, and resonant frequency.

Figure 5:
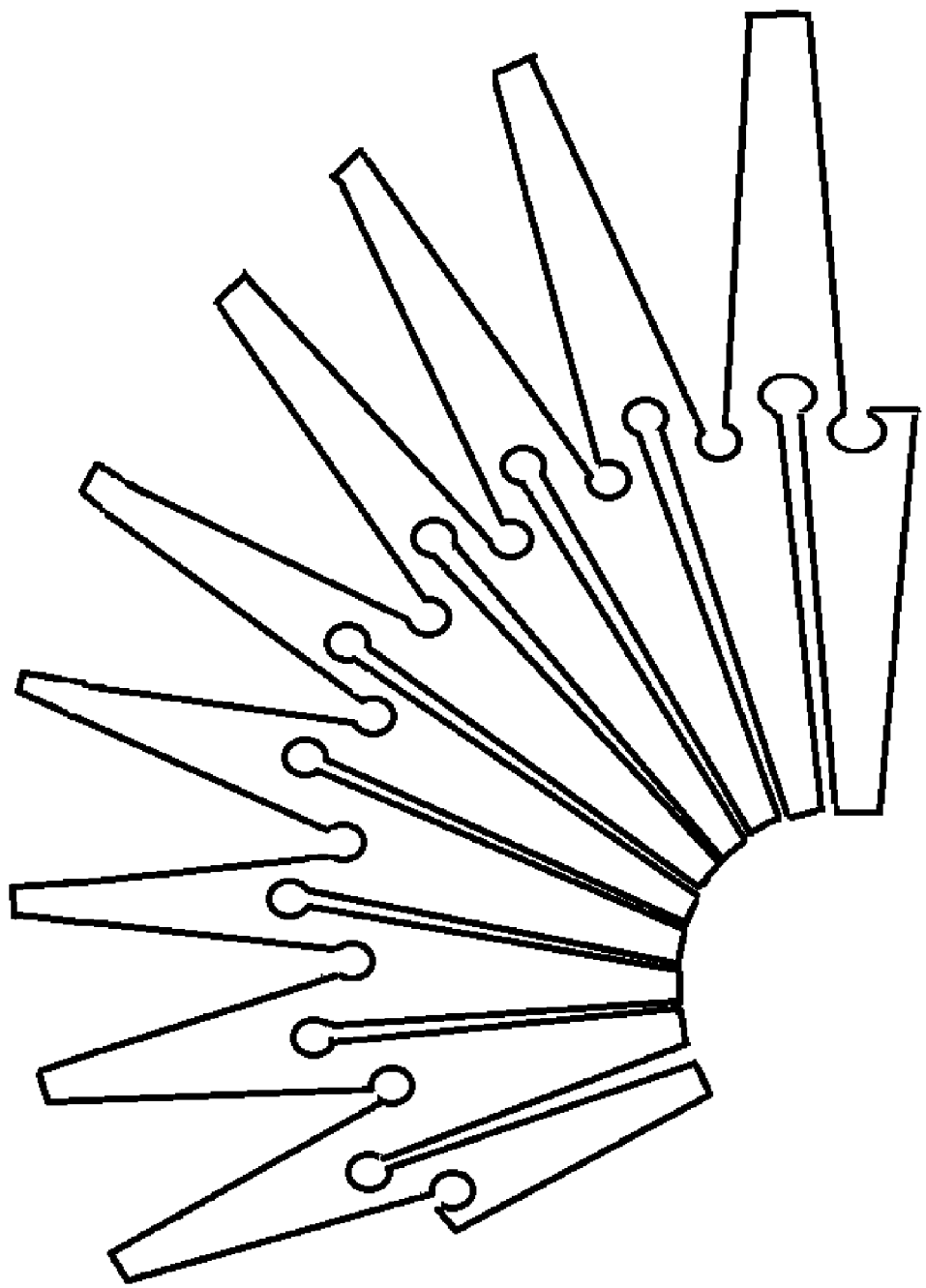
FIG. 5 is a drawing illustrating a cross section of an implementation of flexible body during deflection.

FIG. 5 is a drawing illustrating a cross section of an implementation of flexible body 200 during an example deflection. The flexible body 200 can deflect in a lateral direction (relative to the cross section view). The deflection can be in a single direction (as shown in FIG. 5), or in changing direction radially from a center line such as in a planar sine wave. Each feature proximal width 325, feature distal width 330, feature length 320, spring element frequency 345, spring element amplitude 340, and spring element diameter 335 can be varied to control range of motion/deflection, spring constant and resonant frequency of the flexible body 200. The range of motion/deflection, spring constant, and resonant frequency characteristics can be varied based on the intended application. For example, a UUV intended for longer distance but slow speed travel can include a flexible body 200 with a lower resonant frequency for increased propulsion efficiency than a UUV intended for shorter distance but higher speed travel.

Figure 6:
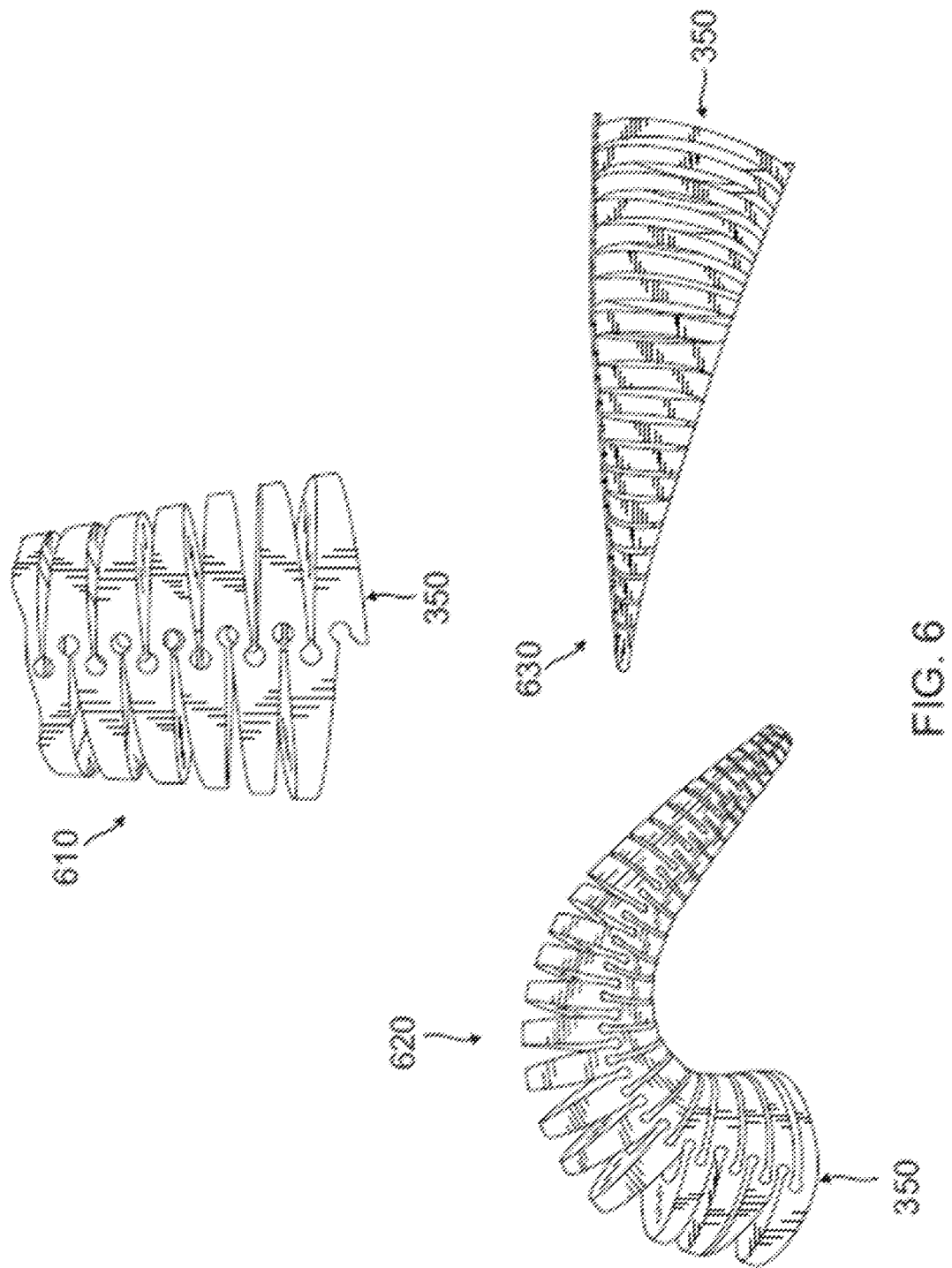
FIG. 6 is a series of drawings illustrating a cross section of an implementation of flexible body.

FIG. 6 is a series of drawings illustrating an example implementation of a flexible body 200. The flexible body 200 can include a cavity 350 along the main axis. At 610 is a top view of a portion of the flexible body 200 at rest (i.e. not deflected), at 620 is a top view of the flexible body 200 during deflection, and at 630 is a side (orthogonal) view of the flexible body 200 at rest (i.e. not deflected). In this example, the flexible body 200 and the cavity 350 are approximately conic.

Figure 7:
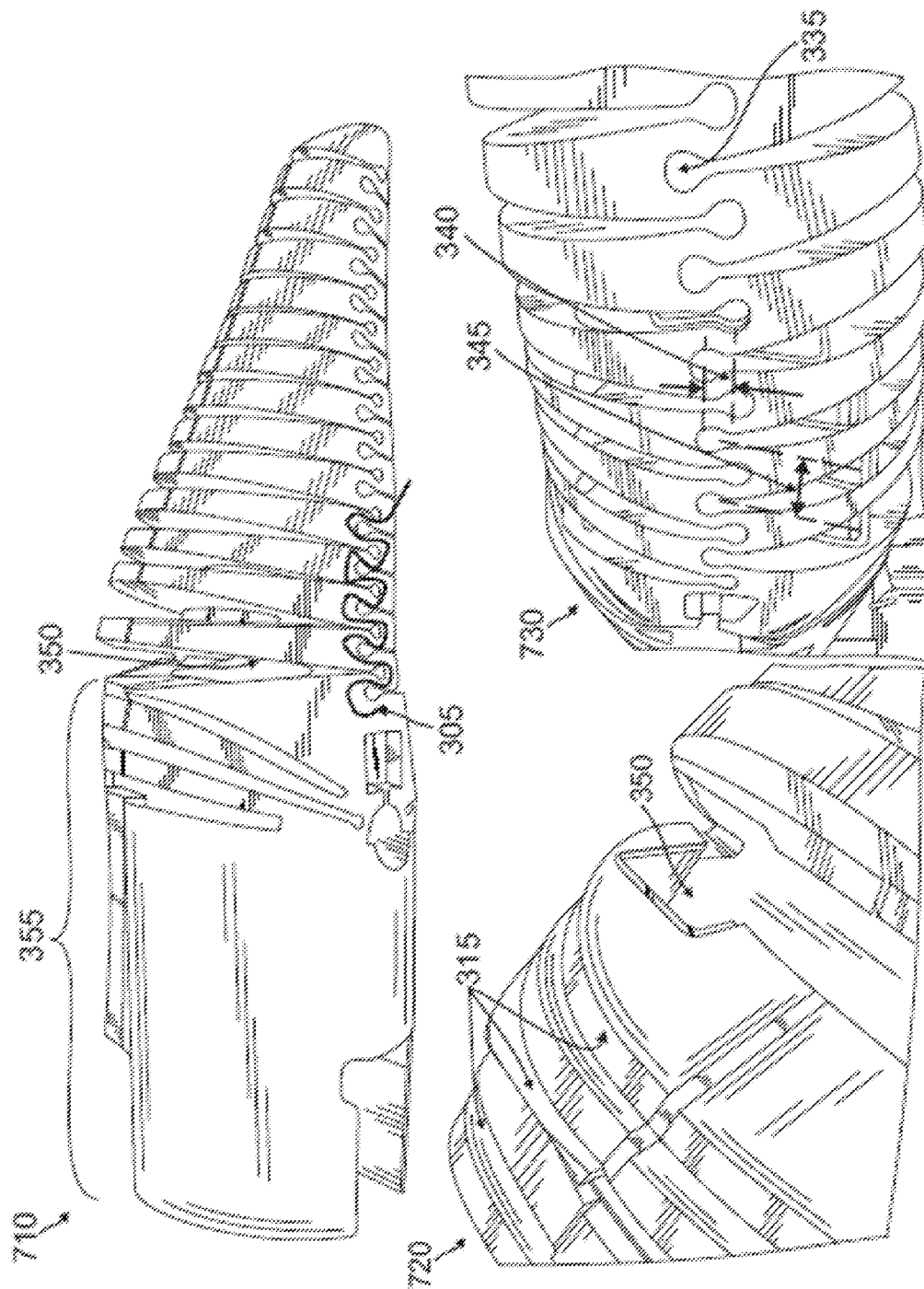
FIG. 7 is a series of drawings illustrating an example embodiment of the flexible body.

FIG. 7 is a series of drawings illustrating an example embodiment of the flexible body 200. At 710 is a top perspective of the flexible body 200 that further includes a fore-body interface 355. The spring elements 305 with features 315 are shown as well as cavity 350. In this embodiment, the features 315 length 320, proximal width 325 and distal width 330 have been varied to give the flexible body 200 a biomimetic shape that could be considered approximately conic in shape and a smooth outer hydrodynamic surface. At 720 is a close up side perspective of several features 315. The cavity 350 is also shown. At 730 is a top view of a portion of the example embodiment. The spring element amplitude 340 and frequency 345 are illustrated as well as the open element diameter 335.

Figure 8:
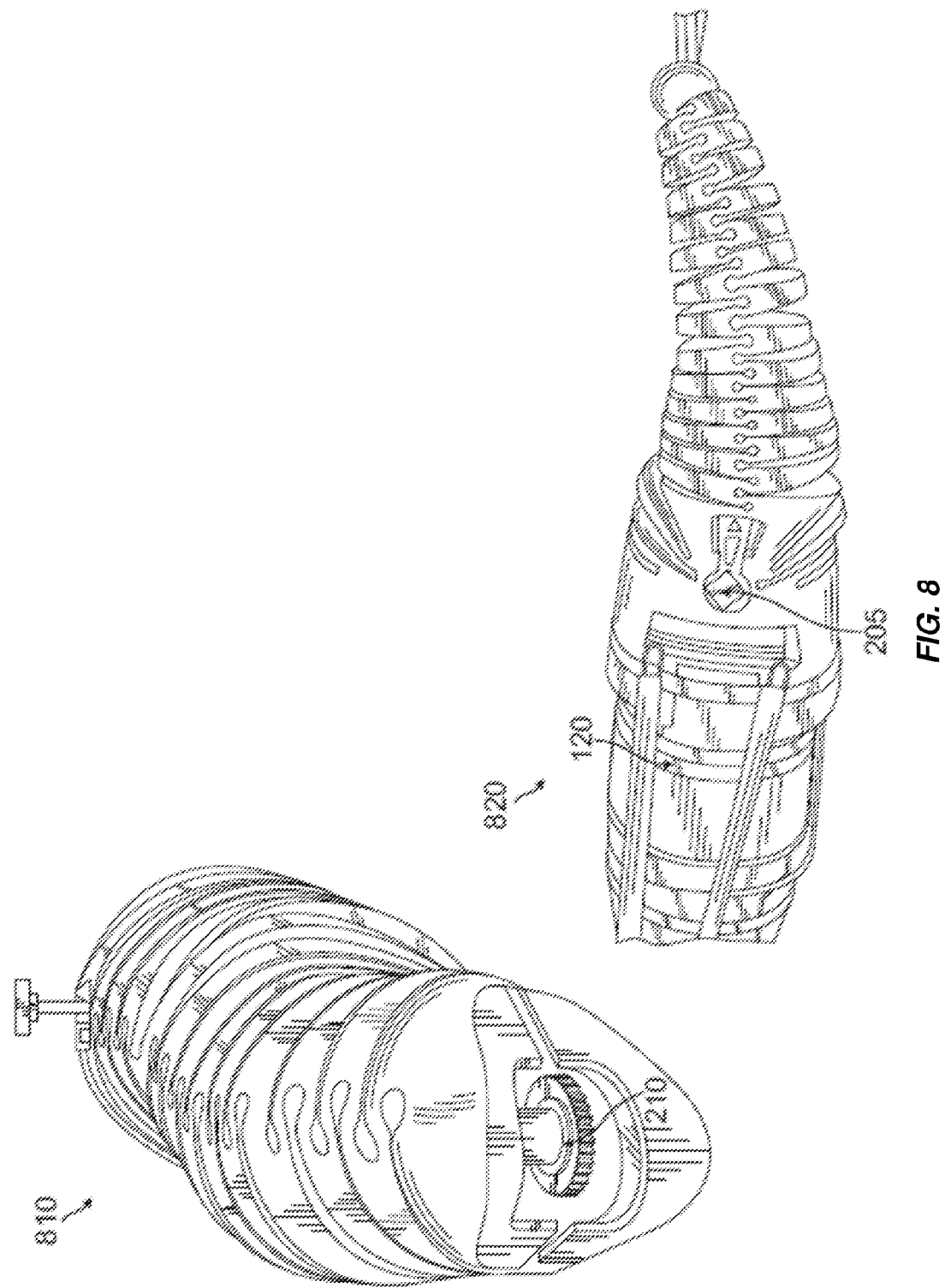
FIG. 8 is a series of drawings illustrating an example embodiment of the flexible body mounted to a fore-body, including an actuation system and a drive system.

FIG. 8 is a series of drawings illustrating the example embodiment of the flexible body 200 mounted to a fore-body 120. FIG. 8 includes an actuation system 205, and a drive system 210. The drive system 210 resides within the cavity 350 and can actuate or articulate to deflect the flexible body 200 in any planar shape desired. At 810 is a top rear perspective of the flexible body 200. A portion of the drive system 210 is visible from this perspective. At 820 is a top view of the flexible body 200 attached to the fore-body 110. The flexible body 200 is solidly attached at the posterior of the fore-body 110 and is located over the drive system 210 by its internal geometry but has slack for relative motion and for sliding along the drive system 210 if required.

The flexible body 200 can be composed of a material that is formed into the desired outer shape. In the example embodiments shown herein, the outer shape is conic, cylindrical, or mimics the shape of a posterior end of a tuna fish. The material can range from compliant material such as rubber and foam to non-compliant material such as steel. In one embodiment, the flexible body 200 is formed from a polyurethane composition. The material can include other compositions such as silicones and composites. When the flexible body 200 is attached to and around the drive mechanism intended to deflect a portion of the vehicle, whether for UUV propulsion, maneuvering, or braking, it deflects with the drive mechanism such that the outer shape follows the intended kinematic and hydrodynamic output of the drive mechanism's input. The features 315 are configured to account for length changes that occur during body flexure by providing relief along the length of the flexible body 200. The series of spring elements 305 bend back and forth through the oscillatory motion, distributing the overall deflection of the motion across several spring elements 305. The spring-like structure of the flexible body 200 allows it to be comprised of soft to stiff materials without encountering fracture, wear, or supplying unintended high reaction forces to the drive system. The amplitude 340 and frequency 345 of the spring elements along the length can be modified to optimize deflection forces as well as reduce reacted forces that are introduced into the system, thereby improving efficiency and smooth operation of the system. While the flexible body 200 in this example embodiment is attached at the posterior of the fore-body 120 and located over the drive system 210, other configurations are possible.

Generally, the design and selection of the flexible body 200 spring elements, material properties, and dimensional properties enable the drive system to impart resonant and other frequencies into the flexible body 200. This provides additional energy or propulsive capability via the flexible body's natural vibratory responses. Preferably, the flexible body 200 can be implemented as a single piece thereby improving ruggedness, flexibility, and resistance to compressibility, although the flexible body 200 can include multiple flexible elements and materials.

The flexible body 200 can be used for underwater or other media systems. By modification of the flexible body 200, buoyancy can be adjusted. The spring elements 305 enable shape restoration (e.g., the flexible body 200 can regain its initial shape without input power from the drive system 210). The flexible body 200 can also serve as a protective element by dampening impact from the external environment. It enables the generation of a smooth hydrodynamic or aerodynamic surface for efficient propulsion, maneuvering, and other operation within relevant environments. The flexible body 200 can also act as a mounting element for external functional, protective, and/or aesthetic skins (e.g., outer skin 215). The flexible body 200 is shape independent in that it can be generated in many outside volumes and shapes (e.g., conic, cylindrical, etc.) while providing the functions above. The flexible body can function as a portion of the drive system, operating as the bending structure of the drive system and the outer volume (hydrodynamic shape) of the aft section.

Flexible body 200 has a number of advantages. For example, the flexible body does not have multiple moving mechanical parts that add drag, add weight, add cost, act as noise generators, or introduce individual vibratory modes (i.e. operates efficiently and quietly). The flexible body 200 can also have hydro-dynamically advantageous properties such as a smooth outer surface, integrated buoyancy, minimal weight, and minimal deflection and restoring forces. In one example embodiment, the flexible body 200 can be included in a flexible-bodied, biomimetic underwater vehicle to enable high maneuverability, high efficiency, and biomimetic propulsion and maneuvering. By distributing the loading and deflection via a series of small deflections incorporated within the flexible body 200, propulsion efficiency of a flexible propulsor is improved.

A vehicle can include an aft section that floods when the vehicle is placed in liquid (e.g., water). By having an actuation system (located at least partially within the aft) capable of operating while submerged, the external environment can be leveraged to perform a thermal cooling function. When the actuator system is operated while at least a portion of the actuator system is submersed in liquid, the liquid serves to transfer thermal energy produced by the actuator system away from the actuator system.

By having an actuation system that can provide operation in a submerged state, the aft (e.g., tail, flexible aft) does not require seals, sealing features, sealing housings, and other like aspects. Infinite and omnidirectional heat sinking to the environment occurs such that actuator thermal power losses are reduced and the actuator can be driven at peak power levels (including, in some implementations, above power levels specified by manufacturers). The drive system can also operate while submerged.

Submersion of an actuator can apply to various technologies. For example, electromechanical actuators, Lorentz actuators, shape memory alloys, and artificial muscles.

Figure 9:
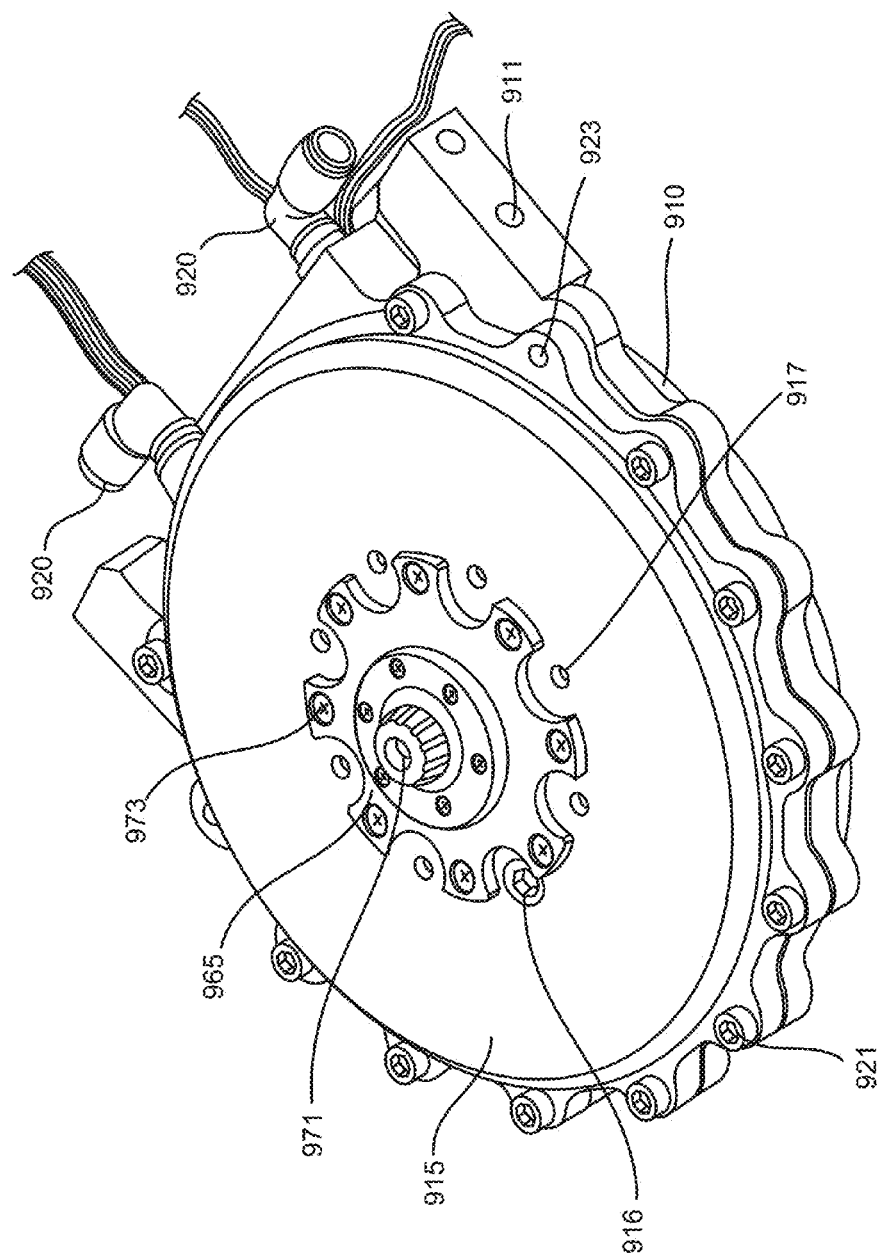
FIG. 9 is a schematic illustrating an example embodiment of a fully assembled actuator.

FIG. 9 is a schematic illustrating an example of a fully assembled actuator 900, which in some configurations can operate while submerged in liquid. The actuator 900 includes a bottom housing 910 and a top housing 915 coupled via a series of housing fasteners 921 (e.g., screws, bolts, etc.), bottom housing features 922 (shown at least in FIG. 10A) and top housing features 923. The bottom housing 910 includes side mounting holes 911 and pressure fittings 920 (show as NPT fittings). The top housing 915 can include at least one NPT plug 916 and top mounting hole 917, and a main body. Mounted to the top housing 915 is a bearing housing assembly 965 via mechanical reduction fasteners 973 (e.g., screws, bolts, etc.). Output shaft 971 (e.g., rotational shaft) extends from the top housing 915. Notably, the actuator 900 includes integrated mechanical speed reduction (in one implementation this is embodied as an integrated planetary gearbox inside a rotor) and can operate while flooded.

Figure 10B:
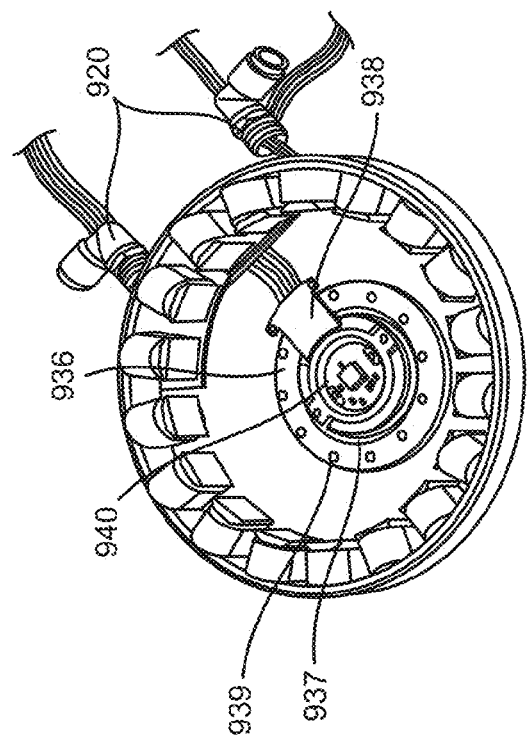
FIG. 10B is the schematic of FIG. 10A with a portion of the bottom housing assembly shown as transparent for illustrative purpose.
Figure 10A:
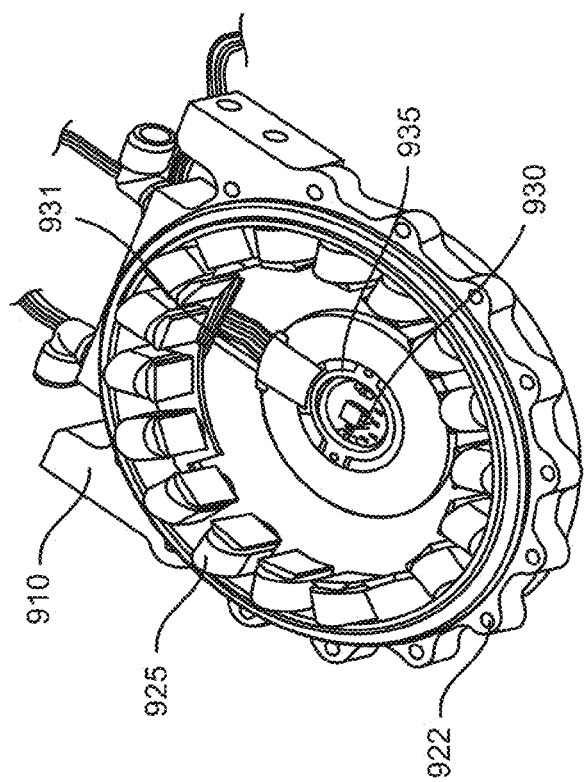
FIG. 10A is a schematic illustrating an embodiment of the actuator bottom housing assembly.

The actuator 900 is driven via a frameless prime mover (comprised of e.g., stator and rotor set and an integrated mechanical reduction in two housings). FIG. 10A is a schematic illustrating an embodiment of the actuator bottom housing 910 assembly. FIG. 10B is the schematic of FIG. 10A with a portion of the bottom housing 910 assembly shown as transparent for illustrative purpose. A stator 925 is rigidly bonded or otherwise attached into the bottom housing 910. The stator 925 is stationary and, in one embodiment includes an electromagnet comprised of field coils or windings for generating a magnetic field. The stator 925 can include other or different features commonly known in the field of electromagnetic actuation such as Lorentz actuators. The stator 925 is optionally coated to protect wiring and coils that comprise the stator 925 from exposure to water. The bottom housing 910, which becomes integral with the stator 925, is also the mounting location for the actuator's feedback sensor 930 (e.g., an encoder, resolver, hall effect sensor, back electromotive-force (EMF) sensor, etc.). The feedback sensor 930 measures the angular position of the driven magnetic assembly 946 (e.g., rotor assembly shown in, FIG. 11 and described in further detail below); provides feedback to both manage acceleration and speed and tune the actuator 900 for efficiency and other dynamics. The feedback sensor 930 can be mounted in the housing bottom 910 with its own mounting cup.

Feedback sensor 930 includes a feedback sensor housing 935, sensor assembly mount 936 with mounting features 939, an O-ring feature for optional face seal 937, a sensor 940, and a sensor wire guard 938. The sensor 930 mounts to the bottom housing 910. The sensor wire guard 938 overlaps the housing features 932 to protect the feedback sensor wiring 931, and mounts to the bottom housing 910.

The bottom housing 910 also contains features 932 to allow wire routing. Wires 931 from the feedback sensor 930 and from the stator 925 can run through features 932 (e.g., troughs, grooves, etc.) that lead to ports 933 (e.g. National Pipe Thread (NPT) or other) on the rear of the bottom housing 910. These ports 933 can allow the wires 931 to exit the bottom housing 916 into a fitting 920. A tube 934 (shown in FIG. 21) can connect to each fitting 920 allowing the wires 931 to run to their destination.

Figure 11:
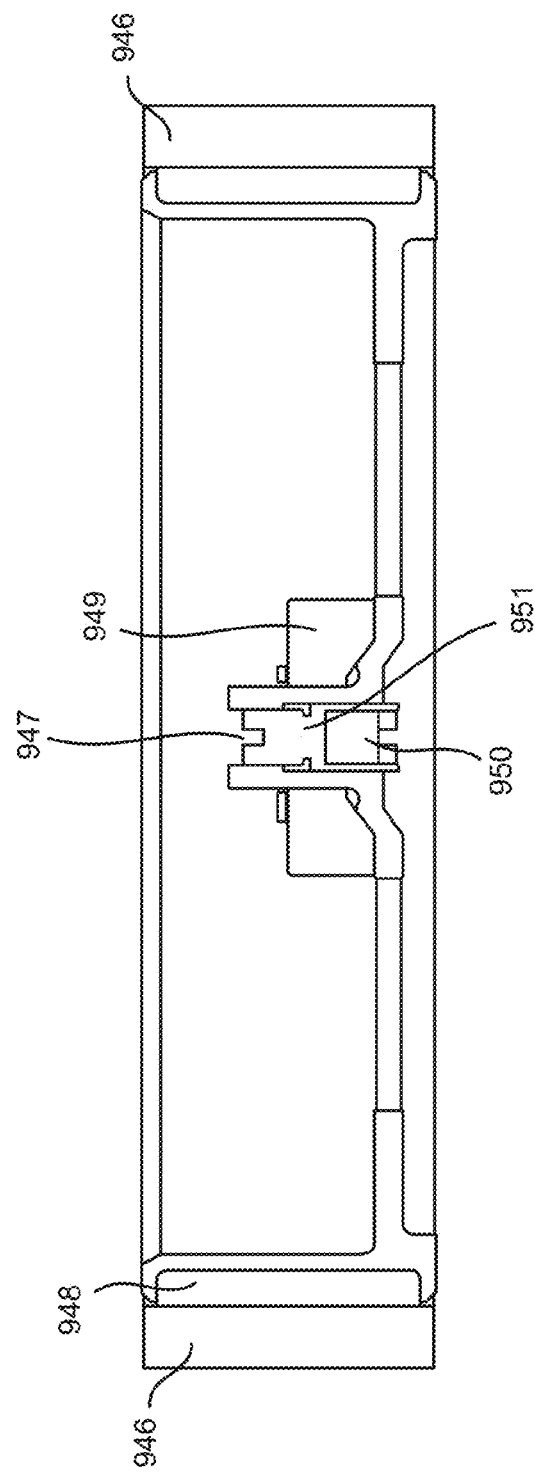
FIG. 11 is a schematic illustrating a cutaway perspective of an embodiment of the rotor assembly.
Figure 16:
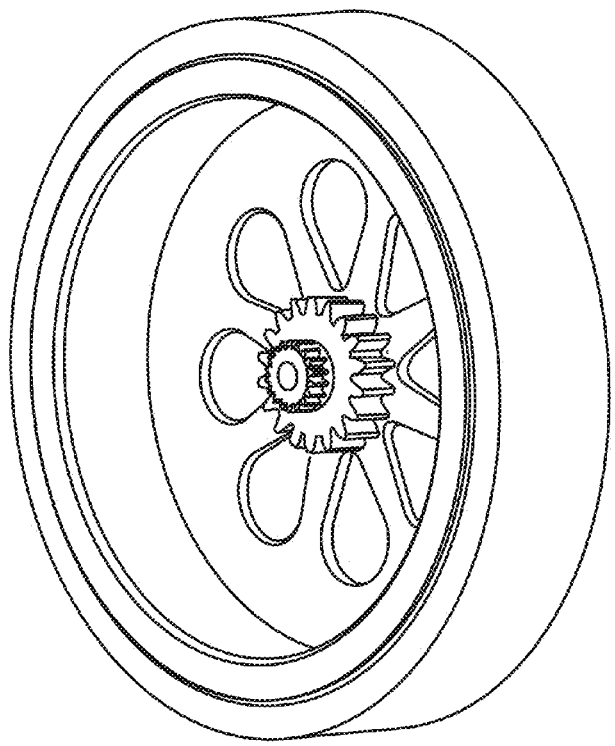
FIG. 16 is a schematic illustrating a perspective of an embodiment of the rotor assembly.

FIG. 11 is a schematic illustrating a cutaway perspective of an embodiment of a driven magnetic device, in this case, the rotor assembly 945. FIG. 16 is a schematic illustrating another perspective of the embodiment of the rotor assembly 945 shown in FIG. 11. The top housing 915 locates a rotor assembly 945 into the top housing 915 and clamps down on the stator 925 to insure no movement during operation. The rotor 946 is bonded onto a rotor hub 947. The rotor hub 947 incorporates an integrated iron-backing ring 948 to contain the rotor's magnetic fields, a sun gear 949, and a sensor magnet 950. The rotor hub 947 and sun gear 949 can be held together with a rotor spline 952. The rotor spline 952 can allow for zero backlash and high torque transmission. The sensor magnet 950 integrates into the rotor hub 947 with a locating screw 951, (e.g., a high-pitch locating screw). The sensor magnet 950 can be bonded into a bore in the locating mount 951. This locating mount 951 allows the sensor magnet's 950 height to be finely adjusted by adjusting the locating mount 951.

Figure 12:
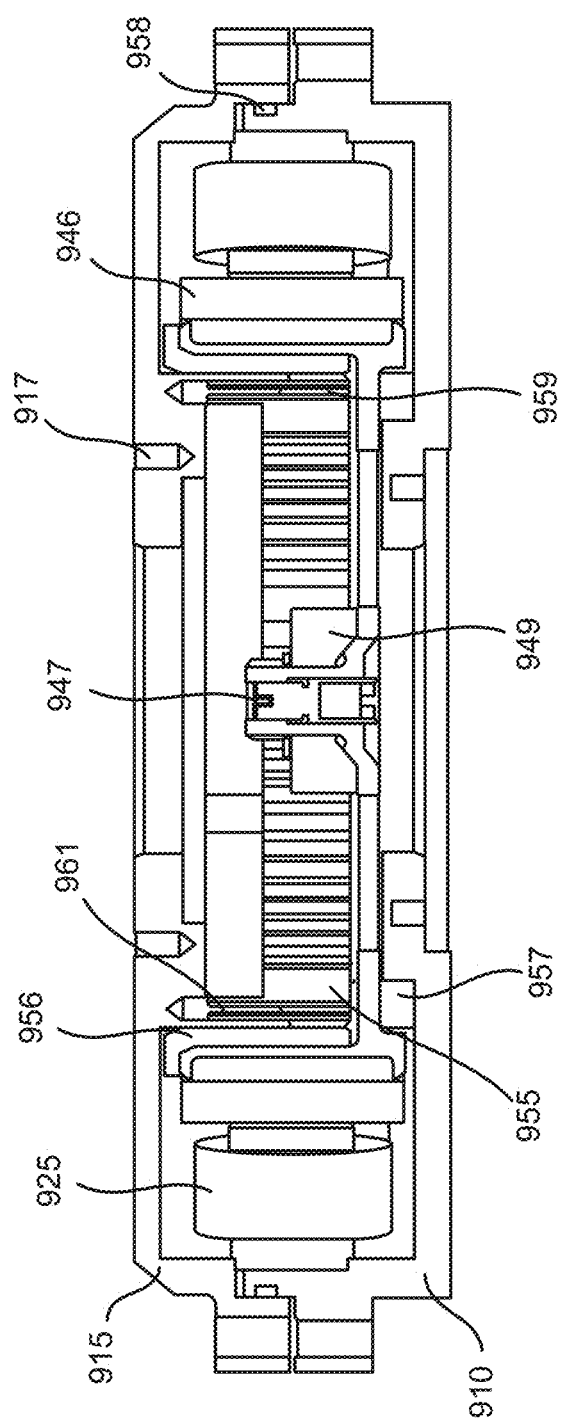
FIG. 12 is a schematic illustrating a cross section of an example embodiment of the actuator (shown without a mechanical reduction)

FIG. 12 is a schematic illustrating a cross section of an embodiment of the actuator 900 (shown without a planet carrier portion of a gearbox). The top housing 915 has a boss 961 in the middle in which the plantary gearbox's ring gear 955 is pinned to. A flanged rotor bushing 956 slides over the ring gear 955 and the boss 961. The inner diameter of the rotor 946 rides on the rotor bushing 956. The rotor bushing 956 material can be selected for hydrophobic properties. Along with the rotor bushing 956, the rotor assembly 945 is located by a thrust bushing 957. The thrust bushing 957 can also be made of hydrophobic material. The thrust bushing 957 can serve as a buffer between the bottom housing 910 and the rotor hub 947. Spring pins 959 locate the ring gear 955.

FIG. 13A is a schematic illustrating an embodiment of a mechanical reduction assembly 965 (e.g., planetary gearbox). The top housing 915 locates the bearing housing 977, mechanical reduction 967, and mechanical reduction carrier 966. In this embodiment, the planetary gearbox 965 includes three planet gears 967, which hold relative to each other on the mechanical reduction 966. As in FIG. 13B, the planet gears 967 have a shaft 970. The shaft 970, along with bushings 968 and snap ring 969, attaches the gears 967 to the mechanical reduction 966. The mechanical reduction 966 includes output shaft 971, and spline 972.

Figure 14:
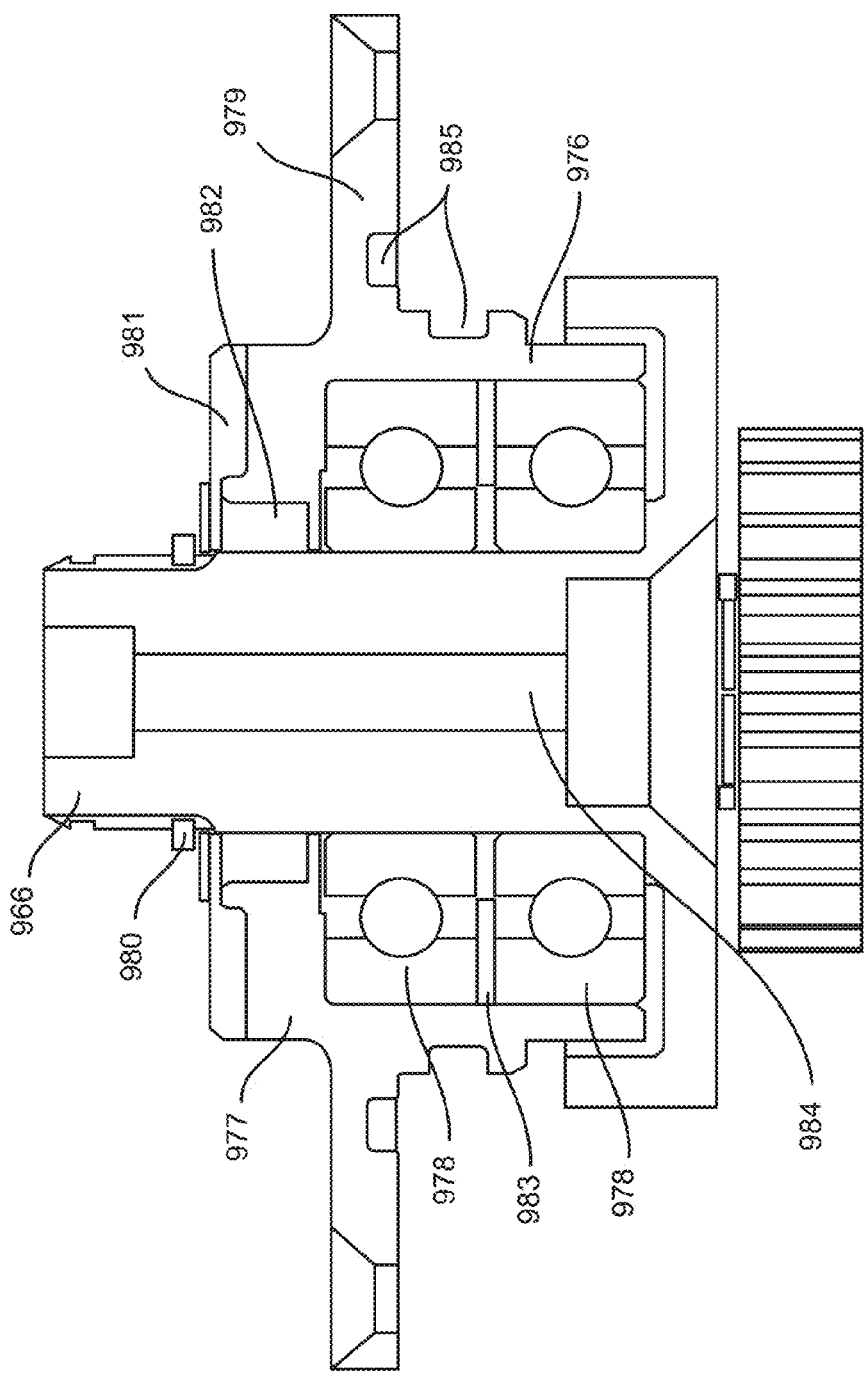
FIG. 14 is a schematic illustrating an implementation of an assembled mechanical reduction and bearing housing assembly.

FIG. 14 is a schematic illustrating an embodiment of an assembled mechanical reduction 965 and bearing housing assembly 975. The mechanical reduction assembly 965 mounts into a top housing plate 977 with a bearing housing 976. In this embodiment, the bearing housing 976 contains two stainless steel ball bearings 978 separated by bearing spacer 983. The ball bearings 978 locate the mechanical reduction 966 and allow the output shaft 971 (planet shaft) to spin with minimal loss during actuator 900 operation. The bearing housing 976 passes through the top plate 977 and affixes to the top housing 915 with its flange 979. The mechanical reduction 966 holds in place with a snap ring 980. The bearing housing assembly 975 further includes an optional rotary seal cap 981, and features for an optional rotary seal 982. Additionally, the bearing housing assembly 975 includes features for optional O-rings 985 for integration with the top housing 915, and a sealing screw location 984 (for providing access for sensor adjustment).

Figure 15:
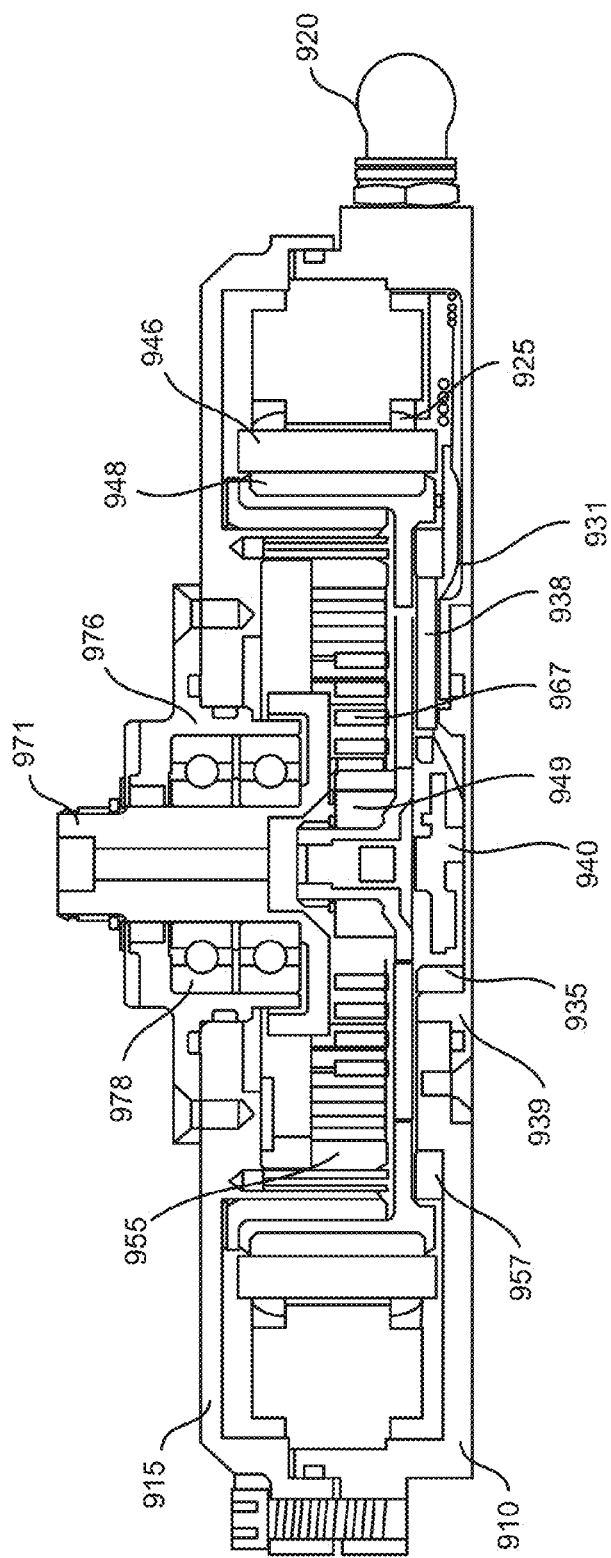
FIG. 15 is a schematic illustrating a cross section of an implementation of a fully assembled actuator.

FIG. 15 is a schematic illustrating a cross section of an embodiment of a fully assembled actuator 900.

In the illustrated embodiments, when the actuator 900 is operated, the rotor 946 spins relative to the fixed stator 925. The rotor 946 spinning causes the planetary gearbox 945 to spin through the coupling of the rotor 946 and the sun gear 949. The planetary gearbox 965 translates the rotation of the rotor 946 into a rotation of the output shaft 971 that rotates at a reduced rate but increased torque, thereby increasing the torque of the actuator 900. The example embodiment shown has a planetary gearbox 965 ratio of 4.4:1, although multiple ratios are possible and contemplated.

All the external components of the example embodiment are implemented in with O-rings, NPT ports, and an output shaft rotary seal if required (they can be required for operating sealed or for testing, pre-use). In one embodiment, the actuator 900 has two side mounting holes 911 and seven top mounting holes 917 arrayed in a circular pattern. The top mounting holes 917 can enable an optional addition of an external gear reduction (not shown). A port 916 on the top housing 915 can drain the actuator 900 if the actuator 900 is run flooded or for seal testing the actuator 900 if it runs dry. If the actuator 900 is to be run flooded, the tubes 934 carrying the wires 931 from the actuator 900 can be potted or plugged.

The actuator 900 described herein has a number of advantages. For example, rotating components are supported by bearings, bushings, and features of appropriate materials combined with the alignment of the actuator 900 components and the feedback sensor 930 to enable the actuator 900 to operate with minimal friction. The bushings (e.g., rotor bushing 956 and thrust bushing 957) configure such that there is little or no swelling of the material when operating in water (swelling increases drag and potentially jams the actuator 900). Rapid, accurate replacement, or variation in the feedback sensor 930 is enabled by this design. The housing, seal, and ports allow the actuator 900 to be sealed and run dry or operated with an internal oil bath for pressure compensation (e.g., in a deep underwater application) and optionally lubrication. The mechanical reduction output shaft's 971 end has a spline 972 for minimal backlash and high torque transmission. The inner components are designed to provide low backlash and high accuracy for efficient propulsion when used in the UUV embodiment.

Additionally, removal of coulomb friction and stiction enables highly efficient oscillatory operation of the drive system 210 under varying loads with varying outputs. The actuator 900 has a slim profile (while still including a frameless motor, feedback sensor 930, supports (i.e. bearings 978), and mechanical reduction (i.e., gearbox)). Since the actuator 900 can be run submerged (e.g., under water), it can take advantage of a cooler ambient environment temperature to perform heat removal and regulation improving power output. Additionally, mechanical losses in the actuator 900 are minimized and the multiple function actuator 900 housing (i.e. bottom housing 910 and top housing 915) incorporates environmental cooling, active liquid cooling, seal testing, and oil-based pressure compensation. Further, the actuator 900 includes highly accurate output and adjustability for tuning the actuator 900.

Figure 17:
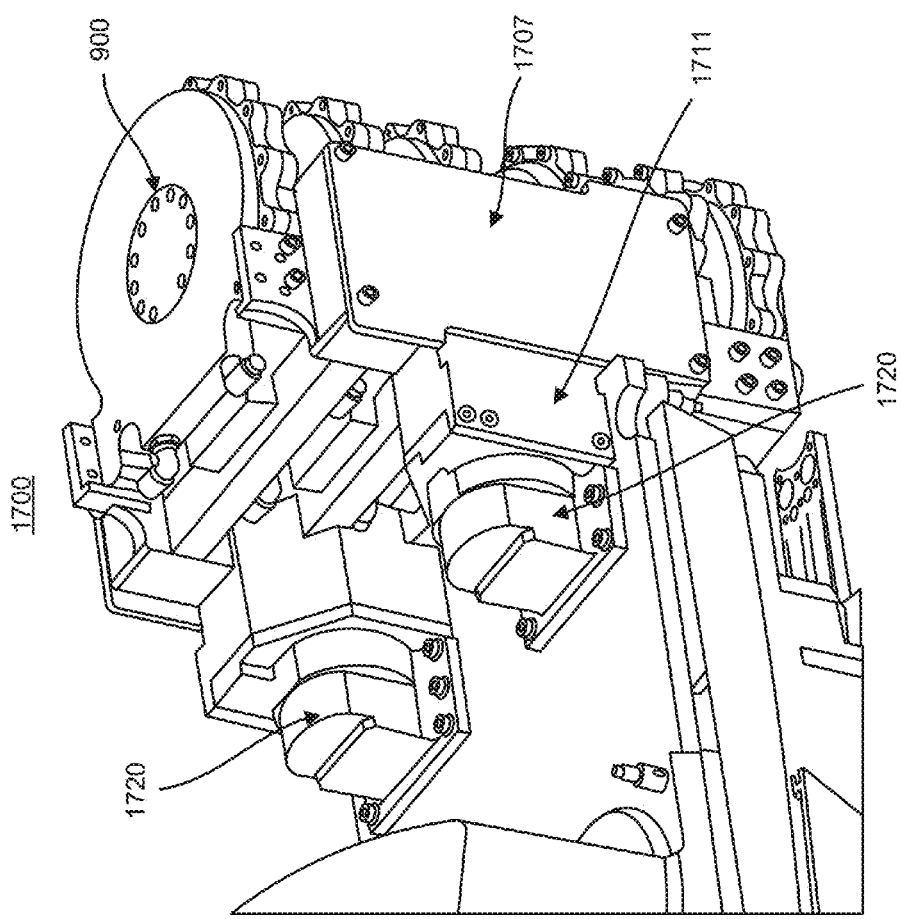
FIG. 17 is a schematic illustrating an implementation of a stack of actuators in a support stack.

Multiple actuators 900 can combine to form an actuation system 1700 (or actuation stack). FIG. 17 is a schematic illustrating an example "stack" of actuators 1700 in a support stack 1705. The stack can be of submersible linear actuators or nonconventional actuators. In one embodiment, the actuation stack 1700 enables a concentrated multiple axis actuator stack that is suitable for efficient operation and control of an underwater vehicle. In one embodiment, the actuators 900 couple with the drive system 210 such that each actuator 900 can articulate a joint in the drive system 210. The actuators 900 work in concert to control overall flexible aft 120 motion.

The actuator stack 1700 can be placed at the anterior end of the propulsion system. The propulsion system refers to the following components: actuator stack 1700, drive system 210, flexible body 200, and propulsive element 220. In the example embodiment shown in FIG. 17, six actuators 900 are stacked vertically and configured to interface with the drive system 210 (not shown in FIG. 17). The propulsion system support stack 1705 includes main body 1711 (or interface support), support stack covers 1707, and connection block 1720. Each actuator 900 can fit into a respective groove 1708 on the interface supports 1711. The actuator 900 can be attached to features 1710 in the interface supports 1711 via fasteners 1709 (or quick connect hardware). The actuator 900 wiring 931 runs to the interface supports 1711 through tubes 934 (shown in FIG. 21) and can connect to terminal blocks 1712 (shown in FIG. 20) inside each interface support 1711. This configuration enables individual actuators 900 to be removed from the stack 1700 for maintenance or replacement. To remove an actuator 900 from the stack, the associated wires 931 are disconnected from the terminal blocks 712 and the actuator is pulled out of the stack 1700 thereby pulling the associated wires 931 through the tubing 934.

The actuator stack 1700 interfaces with the fore-body 120 of the vehicle through two bore seals 1713. These bore seals 1713 are integrated into the actuator stack's interface supports 1711, which enclose the wiring 931, and into mating connector blocks 1720 that are secured to the fore-body 120. The mating connector blocks 1720 are secured to the fore-body 120 with fasteners 721, and are open to the inside of a pressure hull of the vehicle fore-body 120 through face (or bore) seals. The connector blocks 1720 are detachable from the fore-body 120 but detachment is not required for integrating or swapping the propulsion system.

Figure 18:
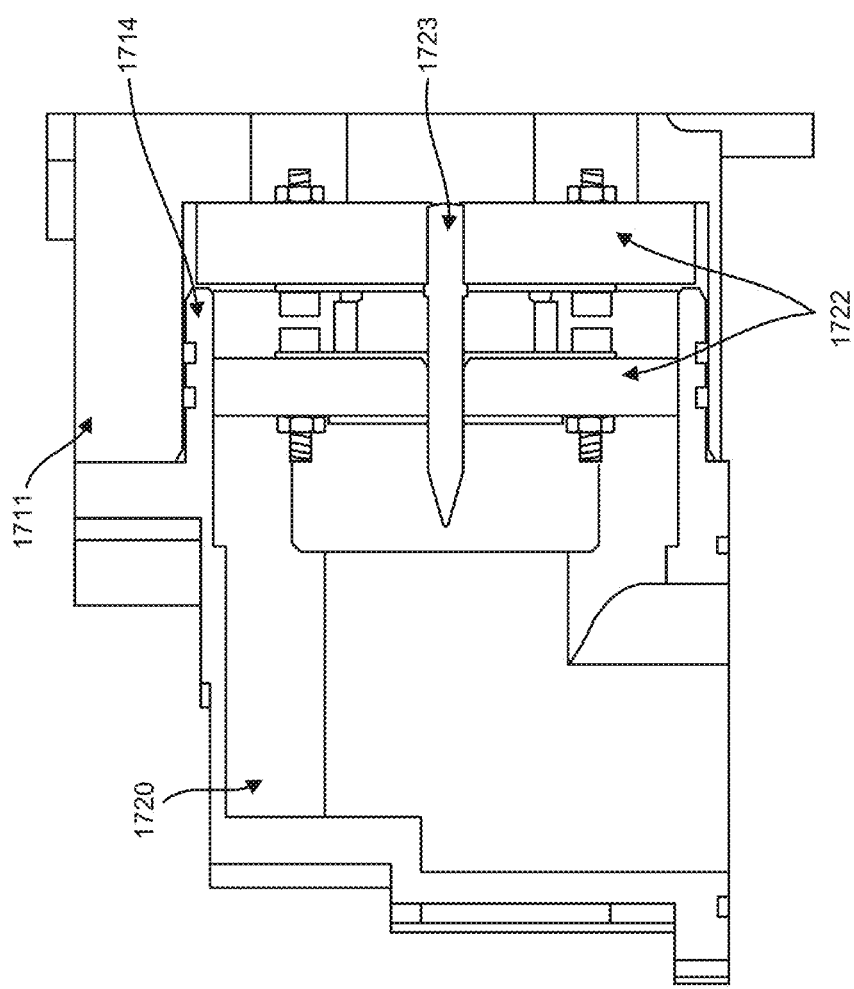
FIG. 18 is a schematic illustrating a cutaway perspective of an implementation of a connector block.

FIG. 18 is a schematic illustrating a cutaway perspective of an example implementation of a connector block 1720. Inside the connector blocks 1720 and the interface supports 1711 are mechanical guides and electrical connectors 1722. The connectors 1722 connect the wiring 931 of the actuator stack 1700 to the fore-body's 120 electronics. The fore-body's 120 electronics package can include one or more of any of the following: a mission controller, a vehicle controller, motion controllers, power system, data acquisition system, communications, and an energy source. In some embodiments, the fore-body 120 can include temperature sensors, pressure sensors, radio module, GPS, speed sensors, one or more Ethernet ports, depth sensing, and related equipment. The electrical connectors 1722, in this embodiment, include four sets of connectors, two in each bore seal 1714. The connectors 1722 mounted in the interface supports 1711 fix in place, while the connectors 1722 in the connector blocks 1720 are allowed to float slightly. The connectors 1722 can align together during connection of the fore-body 120 and flexible aft 110 through a locating or alignment feature 1723 (e.g., pin) on the actuator stack 1700. The floating connector 1722 allows for slight misalignment in attaching the actuator stack 1700 to the fore-body 120.

Figure 19:
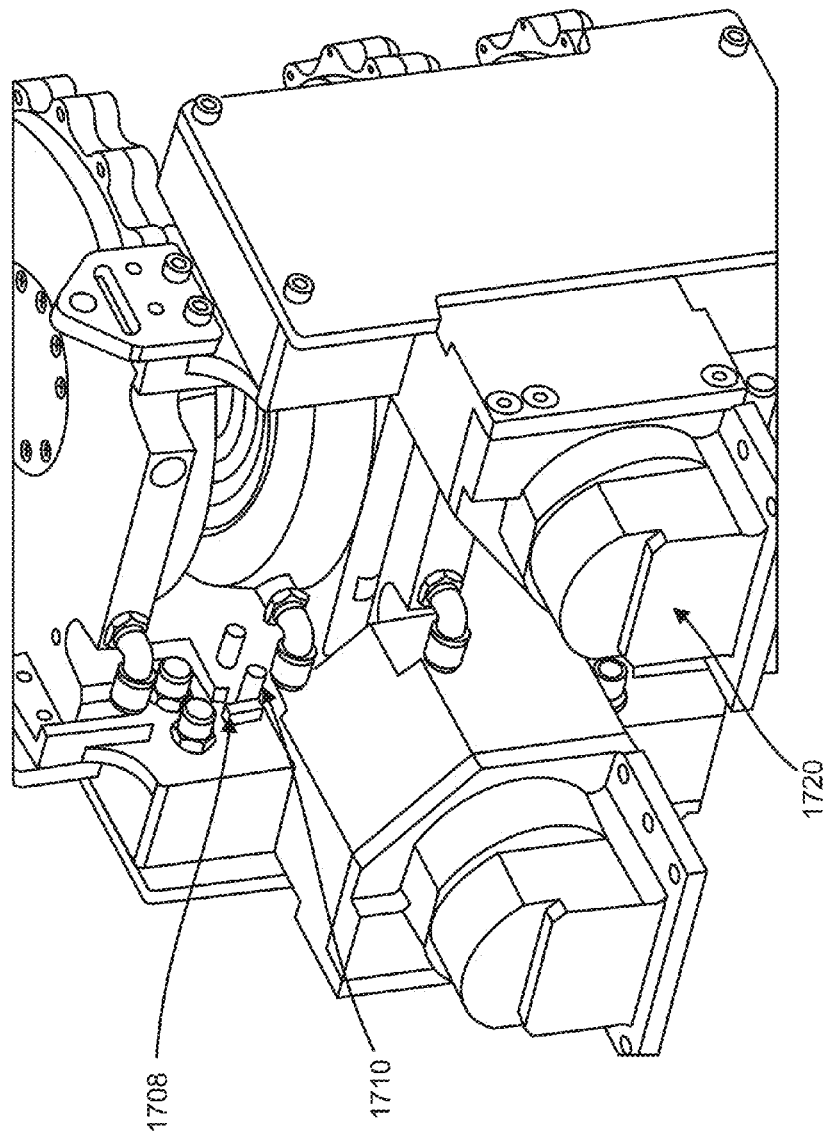
FIG. 19 is a schematic illustrating a close up perspective of an example actuator stack including interface support and connector blocks.
Figure 20:
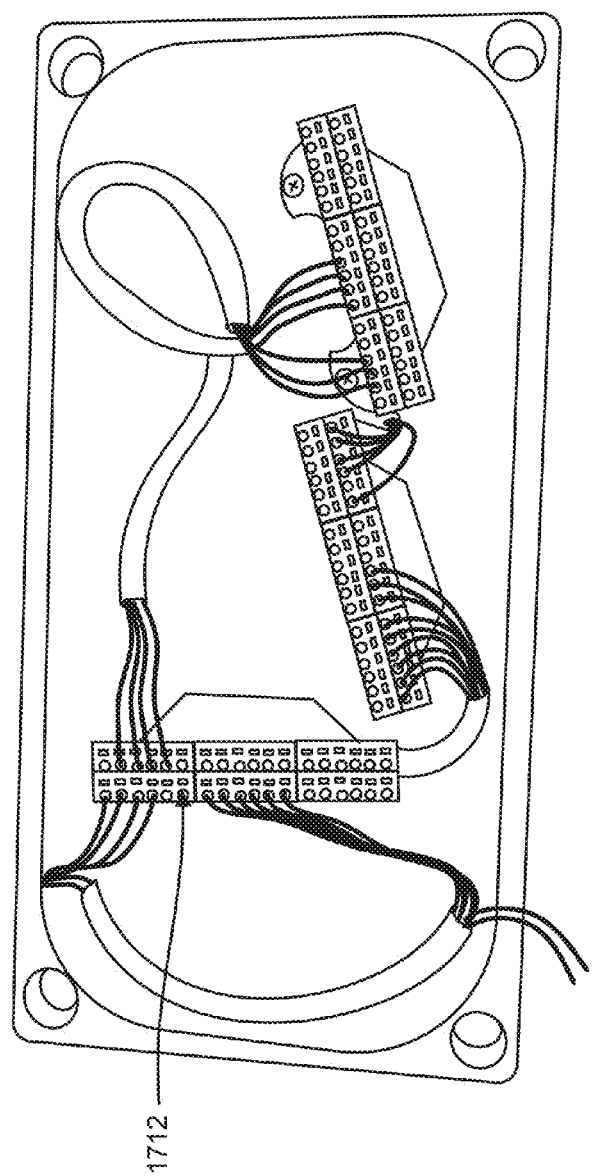
FIG. 20 is a photograph illustrating an example implementation of internal electrical connections, in this case terminal blocks.
Figure 21:
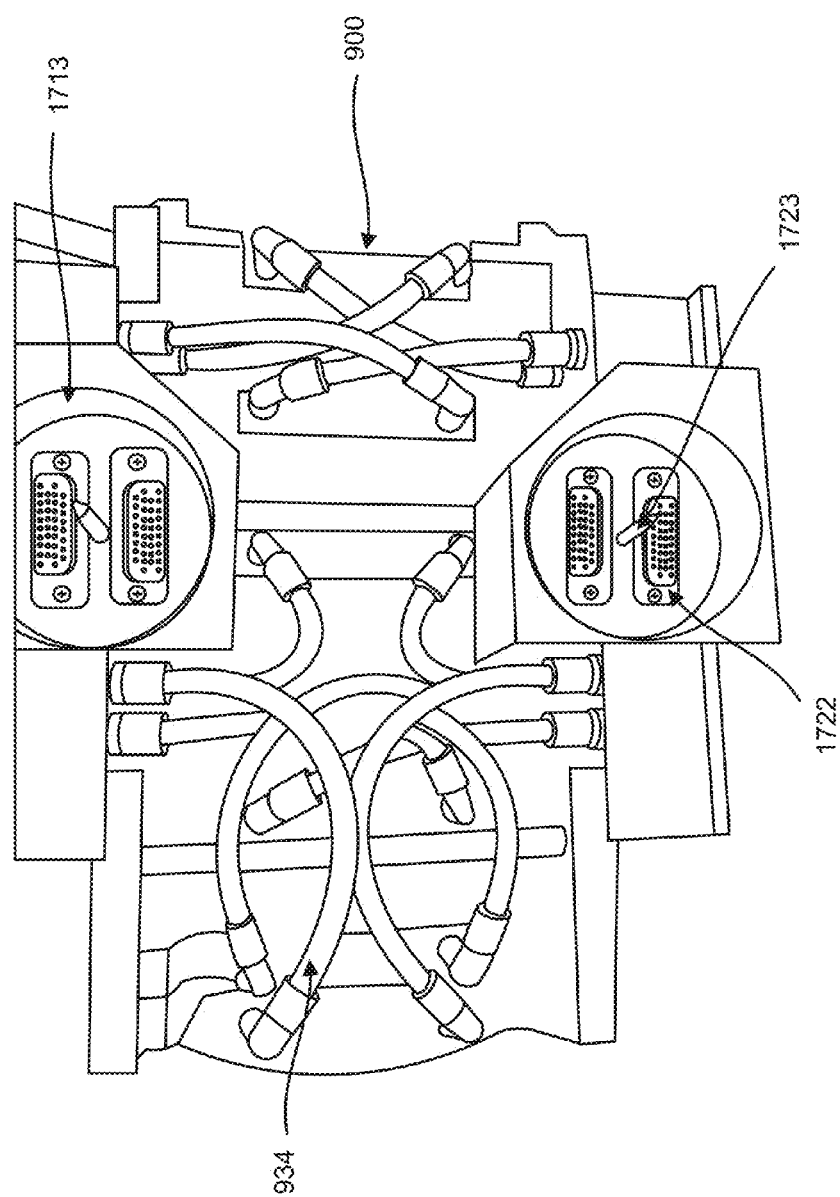
FIG. 21 is a photograph of an example embodiment illustrating a rear perspective of the actuator stack.
Figure 22:
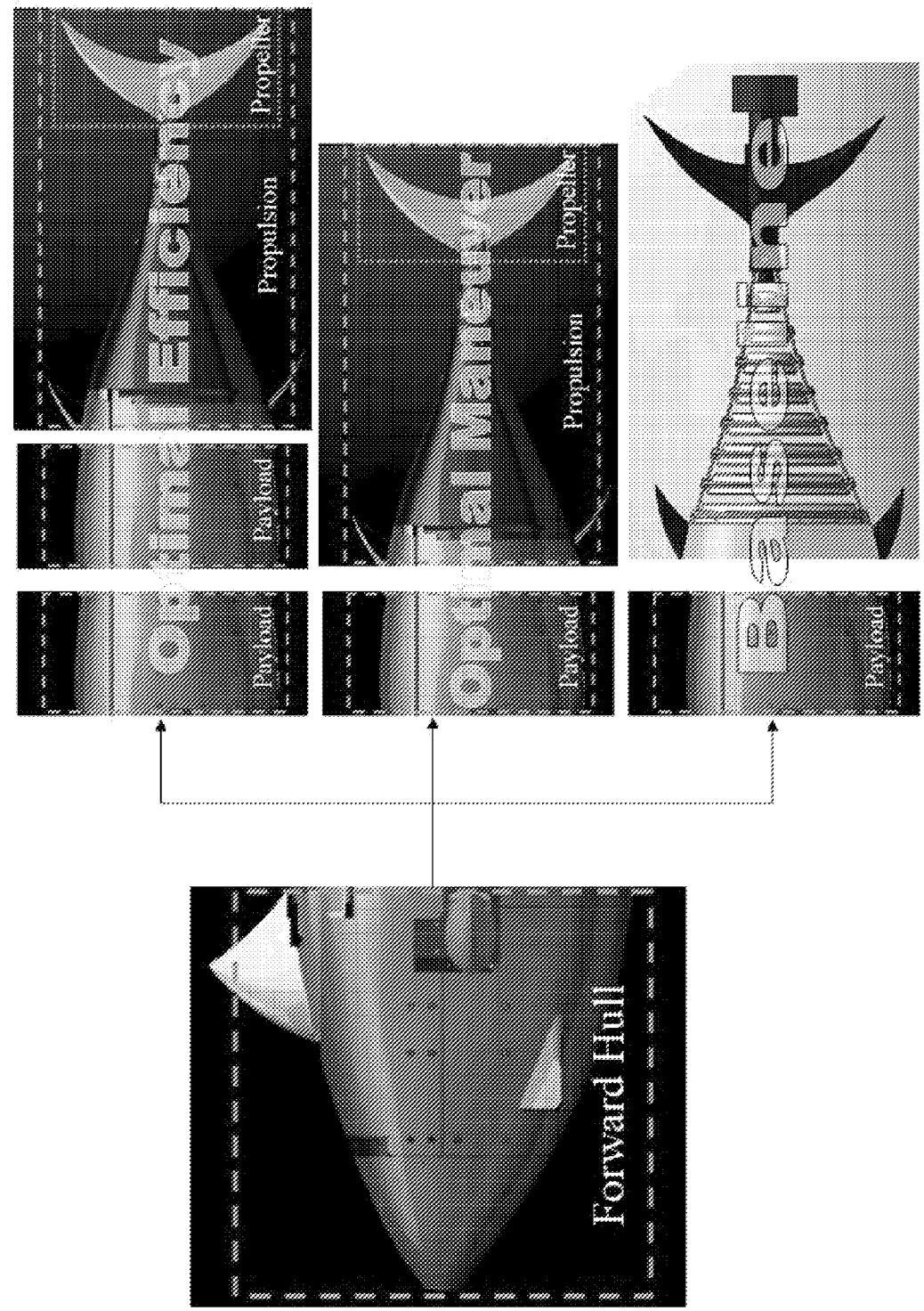
FIG. 22 is a diagram illustrating some advantages of a modular UUV in accordance with the current subject matter.
Figure 23:
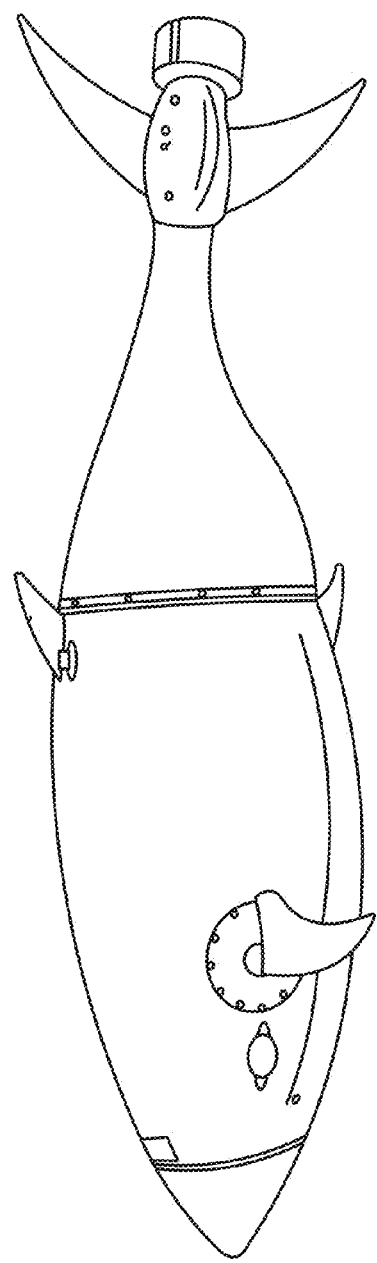
FIG. 23 is a photograph illustrating an alternative flexible aft embodiment wherein the propulsive element includes a foil and a thruster.

FIG. 19 is a schematic illustrating a close up perspective of an example actuator stack 1700 including interface support 1711 and connector blocks 1720. FIG. 20 is a photograph of an example embodiment illustrating terminal blocks 1712. FIG. 21 is a photograph of an example embodiment illustrating a rear perspective of the actuator stack 1700. FIG. 22 is a diagram illustrating some advantages of a modular UUV in accordance with the current subject matter. The flexible aft 110 is modular and can be removed or exchanged for an alternative flexible aft 110. For example, FIG. 23 is a photograph illustrating an alternative flexible aft 110 embodiment wherein the propulsive element 220 includes not only a foil, but also a thruster. Another alternative embodiment includes additional fore-body 120 payload volume. Thus, different flexible aft 110 sections can be easily changed based on the intended application or mission parameters.

The actuator stack 1700 and support stack 1705 provide many advantages. For example, they enable the propulsion system to be removed from the fore-body 120 rapidly, with minimal work, with low risk of component damage, and without disruption of existing wiring. Wiring as used herein can include flex-circuits or other comparable alternatives. The modularity of the propulsion system provides for the ease of: flexible-aft 110 replacement (swap out) for mission specific operation; development improvements and debugging; system assembly and integration; maintainability; testing; advances; and reparability.

Additionally, the actuator stack 1700 and support stack 1705 system provides several redundant layers of protection for sensitive electrical components and thereby saves cost of waterproofing the cabling and electrical connections going into the fore-body 120. This enables off the shelf, non-wet connectors to be used instead of wet cables. Wet cables are expensive, often have very limited number of times to make and break connections, and options are limited. Cables have to be vetted and molded, adding cost and lead-time. Dry connectors are far less expensive, easier to come by, smaller, and there are many varieties available. Further, there are more failure points in systems with wet cables and bulkheads. In that case, each bulkhead must be water tight to the hull along with the seal between the bulkhead and the cable running to the other system. As such, there are more places and thus more opportunity for water ingress and system damage. Some embodiments of the current subject matter have just two bore seals to connect the two systems.

The fore-body 120 and the flexible aft 110 can be pressure or vacuum tested as a whole rather than independently (such as when wet cables are used) because the two system's air volumes are not connected in the latter. In other words, both systems no longer have to be seal-checked separately prior to use. Connected air volumes reduce the requirement for multiple internal health sensors that monitor the status of vehicle conditions, like temperature, pressure, and potential leaks. If the two air volumes are connected, only one set of these health sensors are required.

Although a few variations have been described in detail above, other modifications are possible. Other embodiments may be within the scope of the following claims.

What is claimed is:

1. A flexible body comprising:
 a spring body including a spring element extending along a main axis, the spring element comprising two opposed semicircular portions formed in an S shape;
 features extending in a second axis perpendicular to the main axis and defining an outer shape;
 a cavity within the spring body and the one or more of the features.

2. The flexible body of claim 1, wherein the features extending in the second axis comprise tabs, each feature integral with a corresponding semicircular portion such that each spring element has at least two opposite facing features.

3. The flexible body of claim 1, wherein the outer shape is biomimetic, conic, or cylindrical.

4. The flexible body of claim 3, wherein the features taper along the main axis.

5. The flexible body of claim 1, wherein the spring body comprises a plurality of spring elements, and one or more attributes of the spring elements vary among the spring elements, the attributes including one or more of shape, amplitude, frequency, materials, and thickness.

6. The flexible body of claim 5, wherein the attributes vary such that when deflected, the flexible body moves in a biomimetic motion.

7. The flexible body of claim 1, wherein the cavity extends the entire length of the spring body.

8. The flexible body of claim 1, wherein the cavity extends through a partial length of the spring body.

9. The flexible body of claim 1, wherein the cavity includes a plurality of discreet cavities.

10. The flexible body of claim 1, wherein at least a portion of a drive system resides within the cavity.

11. The flexible body of claim 1, wherein the flexible body forms a flexible frame structure for a drive system contained at least partially within the cavity.

12. The flexible body of claim 1, wherein the flexible body is attached to a fore-body.

13. The flexible body of claim 1, wherein each spring element is biomimetic.

14. An aquatic vehicle comprising:
a fore-body;
an aft section;
an actuator system at least partially within the aft section; and
wherein, the aft section is configured such that, when the aquatic vehicle is within liquid, at least a portion the aft section is flooded with liquid such that at least a portion of the actuator system is submerged and the actuator system is configured such that, when the actuator system is operated while at least a portion of the actuator system is submersed in liquid, the liquid serves to transfer thermal energy produced by the actuator system away from the actuator system.

15. The aquatic vehicle of claim 14, wherein the actuator system comprises:
a top housing;
a bottom housing affixed to the top housing comprising a main body, a feedback sensor, a stator, and a thrust bushing;
a rotor assembly disposed within the bottom housing and top housing, the rotor assembly comprising a rotor, a rotor hub, and a rotation element;
a mechanical reduction assembly disposed within the bottom housing and top housing, coupled to the rotor assembly rotation element, the mechanical reduction assembly comprising a mechanical reduction, one or more rotation elements, and an output shaft; and
a bearing housing assembly affixed to one of the top housing and bottom housing, providing for a rotation of the mechanical reduction, the bearing housing assembly comprising a bearing, and a bearing housing.

16. The aquatic vehicle of claim 15, wherein an electrical current applied to the stator causes the rotor assembly to rotate around the rotor hub, thereby causing the mechanical reduction output shaft to rotate.

17. The aquatic vehicle of claim 15, wherein the rotor assembly rotational element is coupled to the one or more mechanical reduction rotational elements such that a rotation of the rotor imparts a rotation to the mechanical reduction.

18. The aquatic vehicle of claim 15, wherein the actuator system includes ports and features to enable seal testing.

19. The aquatic vehicle of claim 14, wherein, when the aquatic vehicle is submerged in liquid, the aft allows liquid to move between an interior and exterior of the aft, the exterior of the aft including an external environment.

20. The aquatic vehicle of claim 14, wherein the aft comprises a flexible body.

21. An aquatic vehicle comprising:
a fore-body,
an actuation system connected to the fore-body;
a drive system comprising a plurality of flexure points and actuated by the actuation system; and
a flexible body attached to the fore-body and enclosing at least a portion of the drive system, the flexible body comprising:
a spring body including a spring element extending along a main axis; and
a cavity within the spring body;
wherein the actuation system comprises:
an actuator;
one or more interface supports having features, electrical connections, a seal, and the actuator being secured to the features; and
one or more connector blocks connected to the fore-body and the interface supports.

22. The aquatic vehicle of claim 21, wherein an outer shape of the vehicle is biomimetic, conical, or cylindrical.

23. The aquatic vehicle of claim 21, wherein the vehicle is configured for biomimetic propulsion.

24. The aquatic vehicle of claim 21, wherein each actuator comprises:
a top housing;
a bottom housing affixed to the top housing comprising a main body, a feedback sensor, a stator, and a thrust bushing;
a rotor assembly disposed within the bottom housing and top housing, the rotor assembly comprising a rotor, a rotor hub, and a rotation element;
a mechanical reduction assembly disposed within the bottom housing and top housing, coupled to the rotor assembly rotation element, the mechanical reduction assembly comprising a mechanical reduction, one or more rotation elements, and an output shaft; and
a bearing housing assembly affixed to one of the top housing and bottom housing, providing for a rotation of the mechanical reduction, the bearing housing assembly comprising a bearing, and a bearing housing.

25. The aquatic vehicle of claim 21, wherein the actuation system can disconnect from the fore-body.

26. The aquatic vehicle of claim 25, wherein a second and different actuation system can connect to the fore-body.

27. The aquatic vehicle of claim 21, wherein the drive system comprises:
a body with one or more flexible points in the body;
first connectors coupled to the actuation system at a first end; and
second connectors coupled to a propulsive element at a second end.

28. The aquatic vehicle of claim 21, further comprising a propulsive element located at a posterior end of the vehicle.

29. The aquatic vehicle of claim 28, wherein the propulsive element comprises one or more of: foil, thruster, and water jet.

30. The aquatic vehicle of claim 21, wherein the flexible body defines a volume, and when the aquatic vehicle is submerged in liquid, a portion of the volume is flooded with the liquid such that, at least a portion of one or more of the actuation system and the drive system is submerged.

31. An aquatic vehicle comprising:
an actuation system connected to the fore-body;
a drive system comprising a plurality of flexure points and actuated by the actuation system; and
a flexible body enclosing at least a portion of the drive system, wherein the flexible body defines a volume, and when the aquatic vehicle is submerged in liquid, a portion of the volume is flooded with the liquid such that, at least a portion of one or more of the actuation system and the drive system is submerged.

32. An aquatic vehicle comprising:
a drive system comprising a plurality of flexure points;
a flexible body comprising a spring-body including a spring element extending along a main axis, and a cavity within the spring body enclosing at least one flexure point, the flexible body including a resonant frequency of oscillation; and
an actuation system configured to actuate the drive system at the resonant frequency for propulsion.

33. The aquatic vehicle of claim 32, wherein the actuation system is tuned for efficiency.

34. The aquatic vehicle of claim 32, wherein the actuation system is tuned for dynamics.

35. The aquatic vehicle of claim 32, wherein the actuation system provides feedback for managing acceleration and speed.

\* \* \* \* \*